(12) United States Patent
Takeuchi et al.

(10) Patent No.: US 9,389,462 B2
(45) Date of Patent: Jul. 12, 2016

(54) LIQUID CRYSTAL DISPLAY DEVICE AND USEFUL LIQUID CRYSTAL COMPOSITION

(75) Inventors: Kiyofumi Takeuchi, Kitaadachi-gun (JP); Masakazu Kaneoya, Kitaadachi-gun (JP)

(73) Assignee: DIC CORPORATION, Tokyo (JP)

(*) Notice: Subject to any disclaimer, the term of this patent is extended or adjusted under 35 U.S.C. 154(b) by 389 days.

(21) Appl. No.: 13/825,766

(22) PCT Filed: Sep. 22, 2011

(86) PCT No.: PCT/JP2011/071642
§ 371 (c)(1),
(2), (4) Date: Jun. 21, 2013

(87) PCT Pub. No.: WO2012/043386
PCT Pub. Date: Apr. 5, 2012

(65) Prior Publication Data
US 2013/0265527 A1   Oct. 10, 2013

(30) Foreign Application Priority Data
Sep. 28, 2010  (JP) ................. 2010-216912

(51) Int. Cl.
*C09K 19/12* (2006.01)
*C09K 19/42* (2006.01)
(Continued)

(52) U.S. Cl.
CPC ...... *G02F 1/133711* (2013.01); *C09K 19/3066* (2013.01); *C09K 19/322* (2013.01);
(Continued)

(58) Field of Classification Search
CPC ........... C09K 19/3066; C09K 19/3402; C09K 19/42; C09K 19/322; C09K 2019/301; C09K 2019/3004; C09K 2019/3009; C09K 2019/3425; C09K 2019/304; C09K 2019/3037; C09K 2019/0446; C09K 2019/0448; G02F 1/134363; G02F 1/133711; G02F 1/133723; G02F 2001/13712
See application file for complete search history.

(56) References Cited

U.S. PATENT DOCUMENTS

2002/0017634 A1   2/2002   Heckmeier et al.
2008/0204612 A1   8/2008   Komitov
(Continued)

FOREIGN PATENT DOCUMENTS

JP   50-93665 A   7/1975
JP   57-618 A     1/1982
(Continued)

OTHER PUBLICATIONS

Yamaguchi, Y. et al., "19.4: Late-News Papers: Wide-Viewing-Angle Display Mode for the Active-Matrix LCD Using Bend-Alignment Liquid-Crystal Cell", SID Sym. Digest, p. 277-280 (1993).
(Continued)

*Primary Examiner* — Shean C Wu
(74) *Attorney, Agent, or Firm* — Westerman, Hattori, Daniels & Adrian, LLP

(57) ABSTRACT

Provided is a liquid crystal display device of VAIPS mode, which uses a liquid crystal material having negative dielectric anisotropy ($\Delta\varepsilon<0$), and has a high response speed, a wide viewing angle, a high transmittance at the time of light transmission, a high black level at the time of light blockage, and an excellent contrast ratio. Disclosed is a liquid crystal display device including a first substrate, a second substrate, and a liquid crystal composition layer having negative dielectric constant, which is interposed between the first substrate and the second substrate, the liquid crystal display device being an electro-optical display device which has a plurality of pixels, and in which each of the pixels is independently controllable and has a pair of a pixel electrode and a common electrode, the two electrodes are provided on at least one substrate of the first substrate and the second substrate, and the long axis of the liquid crystal molecules of the liquid crystal composition layer is in a substantial vertical alignment or a hybrid alignment with respect to the substrate surface.

33 Claims, 3 Drawing Sheets

(51) Int. Cl.
*C09K 19/30* (2006.01)
*C09K 19/32* (2006.01)
*G02F 1/1343* (2006.01)
*G02F 1/1337* (2006.01)
*C09K 19/34* (2006.01)
*C09K 19/04* (2006.01)
*G02F 1/137* (2006.01)

(52) U.S. Cl.
CPC ............ *C09K19/3402* (2013.01); *C09K 19/42* (2013.01); *G02F 1/133723* (2013.01); *C09K 2019/0448* (2013.01); *C09K 2019/0466* (2013.01); *C09K 2019/301* (2013.01); *C09K 2019/304* (2013.01); *C09K 2019/3004* (2013.01); *C09K 2019/3009* (2013.01); *C09K 2019/3037* (2013.01); *C09K 2019/3425* (2013.01); *G02F 1/134363* (2013.01); *G02F 2001/13712* (2013.01)

(56) References Cited

U.S. PATENT DOCUMENTS

| | | |
|---|---|---|
| 2009/0279044 A1 | 11/2009 | Hakoi et al. |
| 2009/0316098 A1 | 12/2009 | Ishihara et al. |
| 2010/0110351 A1* | 5/2010 | Kim et al. .................. 349/114 |
| 2013/0235290 A1* | 9/2013 | Takezoe et al. ............ 349/33 |

FOREIGN PATENT DOCUMENTS

| | | |
|---|---|---|
| JP | 10-153782 A | 6/1998 |
| JP | 10-186351 A | 7/1998 |
| JP | 10-333171 A | 12/1998 |
| JP | 11-24068 A | 1/1999 |
| JP | 2001-33748 A | 2/2001 |
| JP | 2002-12867 A | 1/2002 |
| JP | 2002-182228 A | 6/2002 |
| JP | 2003-287753 A | 10/2003 |
| JP | 2007-226122 A | 9/2007 |
| JP | 2008-20521 A | 1/2008 |
| JP | 2010-90277 A | 4/2010 |
| JP | 2010-134483 A | 6/2010 |
| JP | 2010-519587 A | 6/2010 |
| JP | 2010-175940 A | 8/2010 |
| JP | 2010-198046 A | 9/2010 |
| WO | 2009/154258 A1 | 12/2009 |

OTHER PUBLICATIONS

Ohmuro, K. "33.3: Development of Super-High-Image-Quality Vertical-Alignment-Mode LCD", SID Sym. Digest, p. 845-848 (1997).
Takeda, A. et al., "41.4: A Super-High-Image-Quality Multi-Domain Vertical Alignment LCD by New Rubbing-Less Technology", SID Sym. Digest, p. 1077-1080 (1998).
Koma, N. et al., "P-1: Development of a High-Quality TFT-LCD for Projection Displays", SID Sym. Digest, p. 461-464 (1997).
Kim, K.H. et al., "Domain Divided Vertical Alignment Mode with Optimized Fringe Field Effect", Proc. 18th IDRC, Asia Display, p. 383-386 (1998).
Hanaoka, K. et al., "40.1: A New MVA-LCD by Polymer Sustained Alignment Technology", SID Sym. Digest, p. 1200-1203 (2004).
Oh-E, M. et al., "S23-1 Principles and Characteristics of Electro-Optical Behaviour with In-Plane Switching Mode", Proc. Asia Display, p. 577-580 (1995).
Lee, S.H. "High-Transmittance, Wide-Viewing-Angle Nematic Liquid Crystal Display Controlled by Fringe-Field Switching", Proc. 18th IDRC, Asia Display, p. 371-374 (1998).
Lee, S.H. "Wide-Viewing-Angle Homeotropic Nematic Liquid Crystal Display Controlled by In-Plane Field", Proc. 13th IDW, p. 97-100 (1997).
Kim, K.H. et al., "A Novel Wide Viewing Angle Technology for AM-LCDs", Proc. 13th IDW, p. 175-176 (1997).
Liu, W. et al., "21.3: Electro-Optical Performance of a Vertically Aligned LCD Mode Using Electrically Controlled Self-Compensation", SID Sym. Digest, p. 319-322 (1998).
Lee. S.H. et al., "P-91: Wide-Viewing Angle Dual-Domainlike Vertical-Alignment LCD", SID Sym. Digest, p. 838-841 (1998).
Kim, K.-H. et al., "41.3 New LCD Modes for Wide-Viewing-Angle Applications" SID Sym. Digest, p. 1085-1088 (1998).
Yoshida, H. et al., "23.1: Fast-Switching LCD with Multi-domain Vertical Alignment Driven by an Oblique Electric Field", SID Sym. Digest, p. 334-337 (2000).
Kim, D.H. et al., "Multi domain vertical alignment liquid crystal device controlled by in-plane field" Eurodisplay Proc., p. 142-145 (2009).
International Search Report of PCT/JP2011/071643, date of mailing date Dec. 20, 2011.
International Search Report of PCT/JP2011/071642, date of mailing date Oct. 18, 2011.
U.S. Office Action dated May 8, 2015, issued in U.S. Appl. No. 13/825,767 (13 pages).

* cited by examiner

LIQUID CRYSTAL DISPLAY DEVICE AND USEFUL LIQUID CRYSTAL COMPOSITION

BACKGROUND OF THE INVENTION

1. Field of the Invention

The present invention relates to a liquid crystal display device which uses a nematic crystal composition having negative dielectric anisotropy.

2. Description of the Related Art

Currently, regarding the devices of the active matrix drive system, display modes such as an optically compensated bend (OCB) mode, a vertical alignment (VA) mode and an in-plane switching (IPS) mode have been applied, due to their display quality, to portable terminals, liquid crystal TV sets, projectors, computers, and the like. Since an active matrix display system has a non-linear circuit provided for each pixel, and it has been suggested to use a thin film transistor (TFT) using amorphous silicon or polysilicon, or an organic semiconductor material. Furthermore, as a method for the alignment of liquid crystal molecules to cope with an increase in display size or high definition display, it has been suggested to use a photo-alignment technology. It has been suggested to use a phase difference film in order to obtain wider viewing angle characteristics for the display, or to use a photopolymerizable monomer in order to obtain clear display (SID Sym. Digest, 277 (1993); SID Sym. Digest, 845 (1997); SID Sym. Digest, 1077 (1998); SID Sym. Digest, 461 (1997); Proc. $18^{th}$ IDRC, 383 (1998); SID Sym. Digest, 1200 (2004); Proc. Asia Display, 577 (1995); and Proc. $18^{th}$ IDRC, 371 (1998)).

However, in order for liquid crystal display television sets to completely replace the conventional television sets utilizing cathode ray tubes (CRT) and to also cope with the demand for 3D imaging or field sequential display, liquid crystal TVs are still not satisfactory in terms of the response speed and viewing angle characteristics. For example, the IPS mode is excellent in the viewing angle characteristics, but is not satisfactory in terms of the response speed; and the VA mode exhibits a relatively fast response speed, but is not satisfactory in terms of the viewing angle characteristics. Accordingly, in addition to the use of the overdrive mode, an amelioration for enhancing the apparent response speed of display elements by changing the frame frequency from 60 Hz to a high frequency such as 120 Hz or 240 Hz, has been in progress. However, there are limitations in overcoming the limit of the response speed that is intrinsic to a liquid crystal material, if amelioration is made only in terms of the electronic circuit of these liquid crystal display devices. Thus, there is a demand for a drastic improvement in the response speed as a result of amelioration in the entirety of a display device including a liquid crystal material.

Furthermore, in order to improve the viewing angle characteristics in regard to the VA mode, a multi-domain vertical alignment (MVA) mode has been suggested in which the viewing angle characteristics are improved by partitioning the pixels, and changing the direction of orientation of the liquid crystal molecules for each of the partitioned pixels. In this mode, it is possible to improve the viewing angle characteristics; however, since it is required to produce liquid crystal cells that have a complicated structure uniformly in order to achieve pixel partitioning, a decrease in production efficiency has been unavoidable.

As a method of drastically improving such a problem, new drive systems that are different from the conventional drive systems have been suggested. For example, there is known a method of aligning a liquid crystal material having positive dielectric anisotropy (Δε>0) perpendicularly to the substrate surface without voltage application, and driving liquid crystal molecules in a transverse electric field generated by the electrodes disposed on the substrate surface (JP 57-000618 A; JP 50-093665 A; JP 10-153782 A; JP 10-186351A; JP 10-333171A; JP 11-024068 A; JP 2008-020521A; Proc. $13^{th}$ IDW, 97 (1997); Proc. $13^{th}$ IDW, 175 (1997); SID Sym. Digest, 319 (1998); SID Sym. Digest, 838 (1998); SID Sym. Digest, 1085 (1998); SID Sym. Digest, 334 (2000); and Eurodisplay Proc., 142 (2009)). In this method, as an electric field in the transverse direction curves, liquid crystal molecules align in a different direction when a voltage is applied; therefore, multiple domains can be formed without performing pixel partitioning as in the case of the MVA mode described above. Accordingly, the method is excellent in view of production efficiency. Liquid crystal display devices of such a mode are called, according to JP 10-153782 A; JP 10-186351A; JP 10-333171A; JP 11-024068 A; JP 2008-020521A; Proc. $13^{th}$ IDW, 97 (1997); Proc. $13^{th}$ IDW, 175 (1997); SID Sym. Digest, 319 (1998); SID Sym. Digest, 838 (1998); SID Sym. Digest, 1085 (1998); SID Sym. Digest, 334 (2000); and Eurodisplay Proc., 142 (2009), by various names such as EOC and VA-IPS, but in the present invention, the display mode will be hereinafter abbreviated as "VAIPS".

However, in the VAIPS mode, since the physical behavior of liquid crystal molecules is different from the conventional method for driving a liquid crystal display device, it is required to select a liquid crystal material under a criterion different from the conventional criteria in connection with the liquid crystal material.

That is, in general, the threshold voltage (Vc) of Fréedericksz transition in a twisted nematic (TN) mode is represented by the following formula:

$$V_C = \frac{\pi d_{cell}}{d_{cell} + \langle r_1 \rangle} \sqrt{\frac{K11}{\Delta \varepsilon}} ; \quad \text{[Mathematical Formula 1]}$$

the same threshold voltage in a super-twisted nematic (STN) mode is represented by the following formula:

$$V_C = \frac{\pi d_{gap}}{d_{cell} + \langle r_2 \rangle} \sqrt{\frac{K22}{\Delta \varepsilon}} ; \quad \text{[Mathematical Formula 2]}$$

and the same threshold voltage in the VA mode is represented by the following formula:

$$V_C = \frac{\pi d_{cell}}{d_{cell} - \langle r_3 \rangle} \sqrt{\frac{K33}{|\Delta \varepsilon|}} \quad \text{[Mathematical Formula 3]}$$

wherein Vc represents the Fréedericksz transition (V); π represents the ratio of the circumference of a circle to its diameter; $d_{cell}$ represents the distance (μm) between a first substrate and a second substrate; $d_{gap}$ represents the distance (μm) between a pixel electrode and a common electrode; $d_{ITO}$ represents the width (μm) of the pixel electrode and/or common electrode; <r1>, <r2> and <r3> represent extrapolation lengths (μm); K11 represents the elastic constant (N) of splay; K22 represents the elastic constant (N) of twist; K33 represents the elastic constant (N) of bend; and Δ∈ represents dielectric anisotropy.

However, in the VAIPS mode, since these general calculation formulas do not fit, and no criteria for selecting the liquid crystal material are available, there has been no progress in the improvement of performance, and consequently, application thereof into liquid crystal display devices has been delayed.

On the other hand, in regard to the VAIPS mode, disclosures have also been made on preferred compounds as the liquid crystal material to be used (JP 2002-012867 A). However, the liquid crystal composition described in the relevant reference document uses a cyano-based compound, and therefore, the liquid crystal composition is not suitable for active matrix applications.

On the other hand, liquid crystal display devices also have a problem of aiming to achieve mega contrast (CR) by enhancing the black level with a bright luminance. It has been suggested to improve the numerical aperture so as to enable increasing the pixel display area of LCDs, to apply a luminance enhancing film such as a dual brightness enhancement film (DBEF) or a cholesteric liquid crystal (CLC) film, or to reduce the light leakage caused by protrusions and the like when the liquid crystal is subjected to vertical alignment. Furthermore, there is also a demand for a display which is not easily brought into disorder even under a pressing pressure in a touch panel system.

SUMMARY OF THE INVENTION

The present invention is intended to solve the problems described above. That is, it is an object of the invention to provide a liquid crystal display device of the VAIPS mode which uses a liquid crystal material having negative dielectric anisotropy ($\Delta\epsilon<0$), and exhibits a fast response speed, a wide viewing angle, a high transmittance at the time of light transmission, a high black level at the time of light blockage, and an excellent contrast ratio.

According to an aspect of the invention, there is provided a liquid crystal display device including a first substrate, a second substrate, and a liquid crystal composition layer having negative dielectric anisotropy that is interposed between the first substrate and the second substrate, in which the liquid crystal display device has a plurality of pixels, each of the pixels is independently controllable, the pixel includes a pair of a pixel electrode and a common electrode, these two electrodes are provided on at least one substrate of the first and second substrates, and the major axis of the liquid crystal molecules in the liquid crystal composition layer is in a substantial vertical alignment or a hybrid alignment.

In the invention, liquid crystal molecules are vertically aligned in at least one substrate surface, but the invention also includes a system in which liquid crystal molecules are aligned vertically to the substrate surface at the other substrate surface as well (hereinafter, referred to as n-VAIPS), and a system in which liquid crystal molecules are aligned horizontally to the substrate at the other surface at the other surface substrate (hybrid alignment) (hereinafter, referred to as n-HBIPS).

Regarding the electrode structure of the n-VAIPS and n-HBIPS modes according to the invention, the electrode structure of the conventional transverse electric field modes such as IPS, fringe-field switching (FFS) and improved FFS can be applied. Furthermore, the behavior of liquid crystal molecules according to the invention is as schematically described in FIG. 1 to FIG. 3, and in a state under no voltage application (FIG. 1), liquid crystal molecules undergo transition, when a voltage is applied through the electrodes disposed in the transverse direction, from a state of being aligned vertically to the substrate surface to horizontal alignment on the electrodes (FIG. 2). At this time, as the liquid crystal molecules adopt a bend alignment state that is advantageous in the flow effect, the system can attempt an increase in the response speed as compared with the conventional liquid crystal display elements.

The liquid crystal display element of FIG. 3 is in a state of reorientation of liquid crystal molecules at the time of voltage application in the case where a common electrode is disposed below a pixel electrode, with an insulating layer interposed therebetween, and a further enhancement in contrast can be attempted by an increase in the numerical aperture of the display pixels.

In a conventional drive method of the VA mode, generally, due to the attempt to widen the viewing angle, it is necessary to define the direction of tilt of the liquid crystal molecules by using zone rubbing, protrusions, slit electrodes and the like, and to promote the formation of multiple domains, and thus the cell configuration tends to become complicated. However, in the n-VAIPS and n-HBIPS modes of the invention, since the direction of tilt of the liquid crystal molecules can be defined by utilizing the phenomenon in which the directions of the line of electric force generated by the applied voltage are different at the two ends of an electrode, the formation of multiple domains can be achieved only by means of the shape of the pixel electrode, and with a relatively simple cell configuration, an increase in the viewing angle and an increase in contrast can be achieved.

In general, the value of the Fréedericksz transition (Vc) is represented by Formula (1) in the TN mode, by Formula (2) in the STN mode, and by Formula (3) in the VA mode. However, it was found that the following Mathematical Formula (4) is applicable to the liquid crystal display device of the invention:

$$Vc \propto \frac{d_{gap} - \langle r \rangle}{d_{ITO} + \langle r \rangle} \frac{\pi d_{cell}}{d_{cell} - \langle r_3 \rangle} \sqrt{\frac{K33}{|\Delta\epsilon|}} \qquad \text{[Mathematical Formula 4]}$$

wherein Vc represents the Fréedericksz transition (V); $\pi$ represents the ratio of the circumference of a circle to its diameter; $d_{cell}$ represents the distance (μm) between a first substrate and a second substrate; $d_{gap}$ represents the distance (μm) between a pixel electrode and a common electrode; $d_{ITO}$ represents the width (μm) of the pixel electrode and/or common electrode; <r>, <r'> and <r3> represent extrapolation lengths (μm); K33 represents the elastic constant (N) of bend; and $\Delta\in$ represents dielectric anisotropy. Regarding the cell configuration according to Mathematical Formula 4, it was found that a decrease in the driving voltage can be attempted by making the value of $d_{gap}$ as low as possible, and the value of $d_{ITO}$ as high as possible, and regarding the liquid crystal composition used, a decrease in the driving voltage can be attempted by selecting a high absolute value of $\Delta\in$ and a low value of K33. Based on these findings, the inventors found a liquid crystal having negative dielectric anisotropy that is appropriate for the liquid crystal display device described above.

The most prominent feature of the liquid crystal display device of the invention is that these liquid crystal molecules that can easily start moving start to move about not at the center between two sheets of substrates, but from a site that is shifted toward any one substrate surface and has been brought closer to one substrate, and this feature is different from that of the conventional TN, IPS, VA and OCB modes.

The invention has improved characteristics such as the response speed, amount of light transmission, light leakage caused by an external pressure such as the use of a touch panel, viewing angle and contrast ratio, and has realized a higher response speed, a larger amount of light transmission, a reduction in light leakage caused by an external pressure, a wider viewing angle, and a higher contrast ratio, as compared with liquid crystal display devices produced by the conventional technologies.

DESCRIPTION OF REFERENCE NUMERALS

Figure 1:
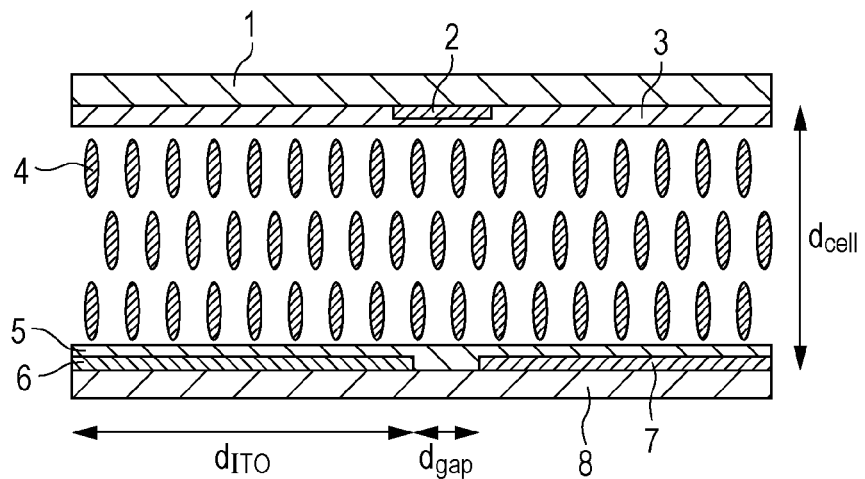
FIG. 1 is a diagram illustrating the state of alignment of liquid crystal molecules without voltage application (an example of n-VAIPS)
Figure 2:
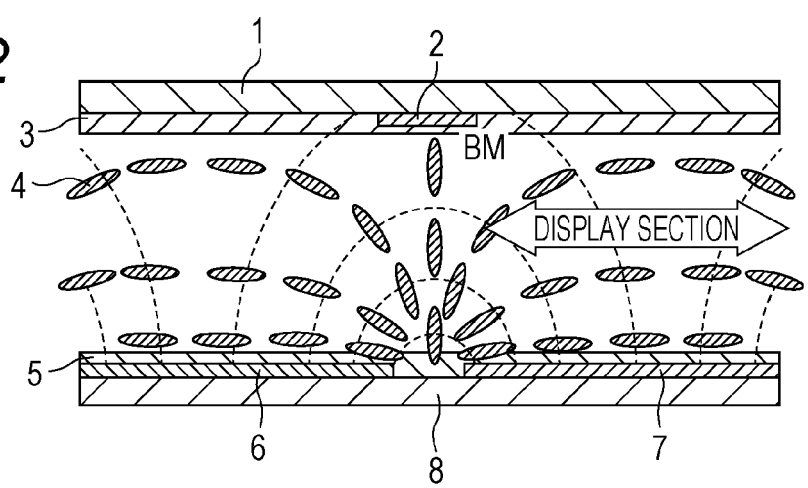
FIG. 2 is a diagram illustrating the state of realignment of liquid crystal molecules at the time of voltage application (an example of n-VAIPS)
Figure 3:
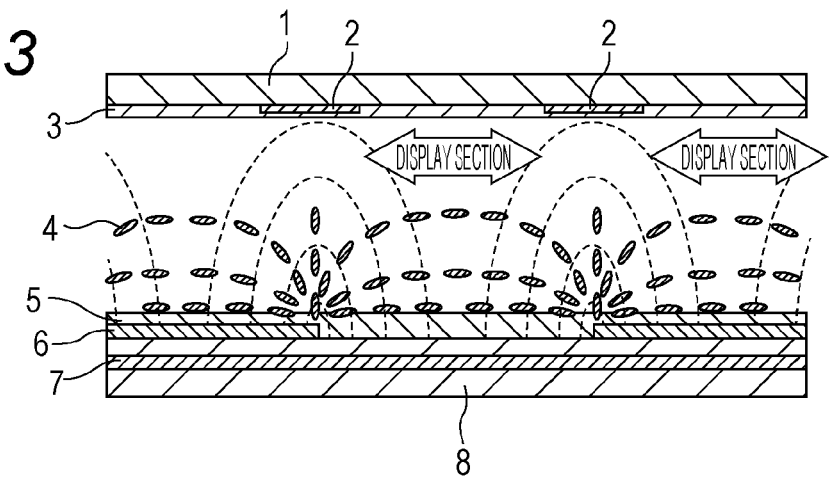
FIG. 3 is a diagram illustrating the state of realignment of liquid crystal molecules at the time of voltage application in the case where a common electrode is disposed below a pixel electrode, with an insulating layer interposed therebetween (FFS) (an example of n-VAIPS)

1 FIRST SUBSTRATE
2 LIGHT BLOCKING LAYER
3 ALIGNMENT LAYER
4 LIQUID CRYSTAL
5 ALIGNMENT LAYER
6 PIXEL ELECTRODE
7 COMMON ELECTRODE
8 SECOND SUBSTRATE

DETAILED DESCRIPTION OF THE PREFERRED EMBODIMENTS

In the present invention, regarding the arrangement of the pixel electrode and the common electrode, the same arrangement as that in the conventional transverse electric field modes such as IPS can be applied, and there are no particular limitations as long as the liquid crystal molecules can be appropriately controlled. However, it is preferable that the distance between the pixel electrode and the common electrode ($d_{gap}$, µm) be smaller than the width of the pixel electrode or common electrode ($d_{ITO}$, µm).

In regard to the liquid crystal display device described above, the liquid crystal composition layer preferably contains two or more kinds of compounds selected from the group of compounds represented by General Formula (LC1) to General Formula (LC5):

[Chemical Formula 1]

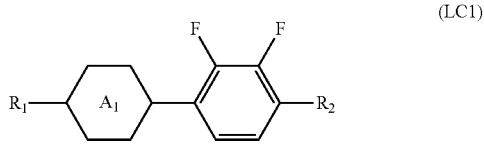
(LC1)

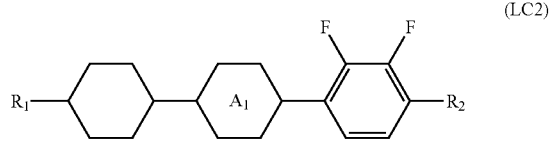
(LC2)

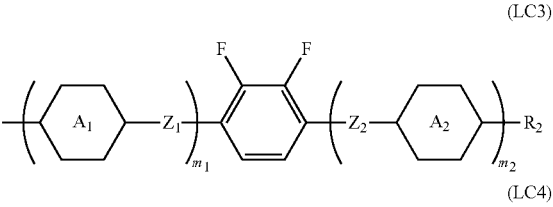
(LC3)

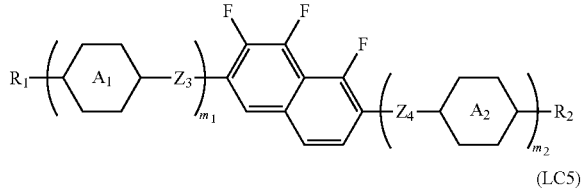
(LC4)

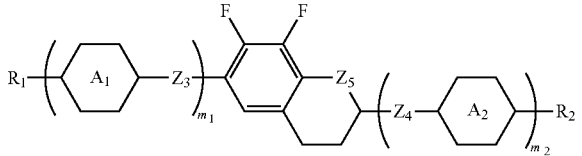
(LC5)

wherein $R_1$ and $R_2$ each independently represent an alkyl group having 1 to 15 carbon atoms; one or two or more $CH_2$ groups in the alkyl group may be substituted by —O—, —CH=CH—, —CO—, —COO—, —COO—, —C≡C—, —$CF_2$O— or —O$CF_2$—, such that O atoms are not directly adjacent to each other; one or two or more H atoms in the alkyl group may be optionally substituted by halogen; $A_1$ and $A_2$ each independently represent any one of the following structures:

[Chemical Formula 2]

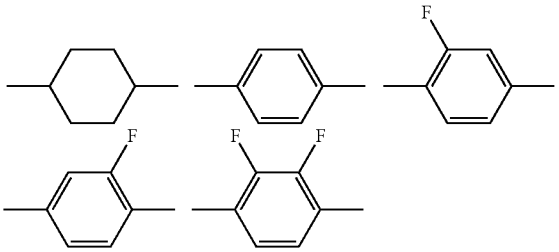

(wherein one or two or more $CH_2$ groups in the cyclohexane ring of the structure may be substituted by O atoms, one or two or more CH groups in the benzene ring of the structure may be substituted by N atoms; and one or two or more H atoms in the structure may be substituted by Cl, $CF_3$ or $OCF_3$); $Z_1$ to $Z_4$ each independently represent a single bond, —CH=CH—, —C≡C—, —CH₂CH₂—, —(CH₂)₄—, —COO—, —OCH₂—, —CH₂O—, —OCF₂— or —CF₂O—, while at least one of $Z_1$ and $Z_2$ is not a single bond; $Z_5$ represents a CH₂ group or an O atom; $m_1$ and $m_2$ each independently represent 0 to 3, and $m_1+m_2$ is 1, 2 or 3.

In the General Formula (LC1) to General Formula (LC5), $R_1$ preferably represents an alkyl group having 1 to 8 carbon atoms, an alkenyl group having 2 to 8 carbon atoms, or an alkoxy group having 1 to 8 carbon atoms;

$A_1$ and $A_2$ each independently represent preferably a 1,4-cyclohexylene group, a 1,4-phenylene group or a 2,3-difluoro-1,4-phenylene group;

$Z_1$ to $Z_4$ each independently represent preferably a single bond, —C≡C—, —CH₂CH₂—, —OCH₂—, —CH₂O—, —OCF₂— or —CF₂O—, and more preferably a single bond, —OCH₂—, —CH₂O—, —OCF₂— or —CF₂O—; and $m_1$ and $m_2$ each independently represent preferably an integer from 0 to 2, while $m_1+m_2$ is preferably 1 or 2.

More preferably, the compound of General Formula (LC2) is a compound represented by any one of the following General Formula (LC2)-1 to General Formula (LC2)-3:

[Chemical Formula 3]

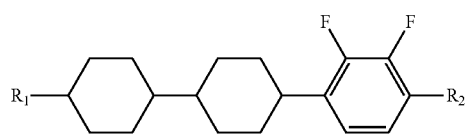
(LC2)-1

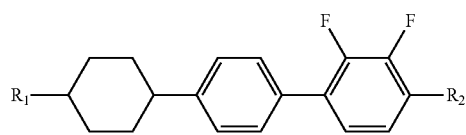
(LC2)-2

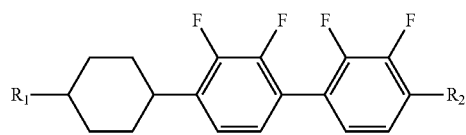
(LC2)-3 wherein $R_1$ and $R_2$ have the same meanings as $R_1$ and $R_2$ of the General Formula (LC2), respectively; and/or the compound of General Formula (LC3) is a compound represented by any one of the following General Formula (LC3)-1 to General Formula (LC3)-13:

[Chemical Formula 4]

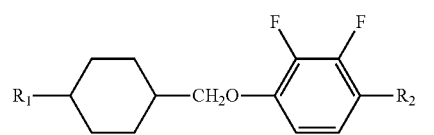
(LC3)-1

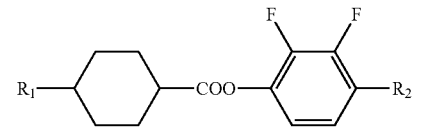
(LC3)-2

-continued

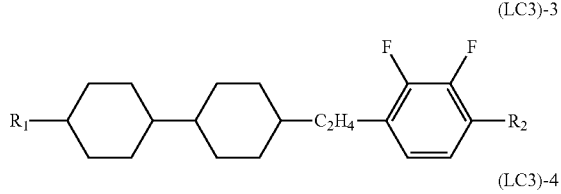
(LC3)-3

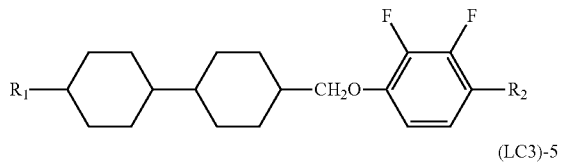
(LC3)-4

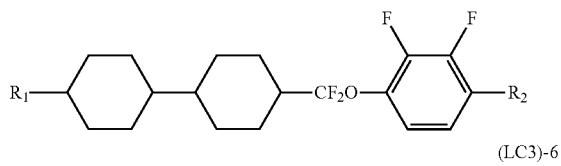
(LC3)-5

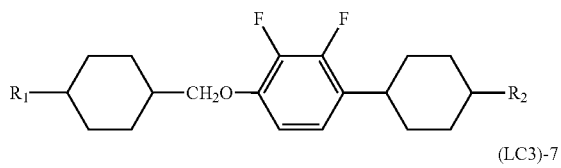
(LC3)-6

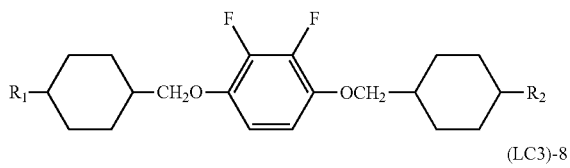
(LC3)-7

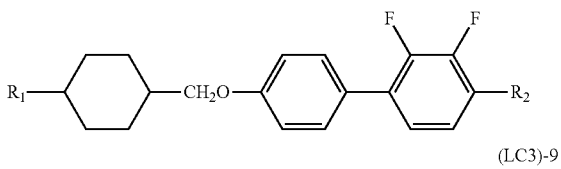
(LC3)-8

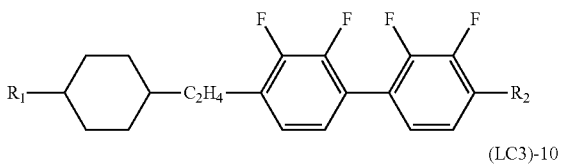
(LC3)-9

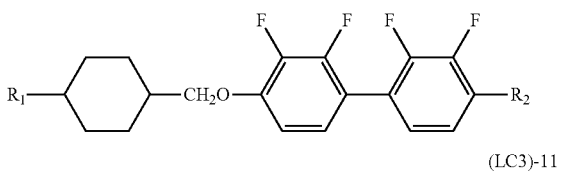
(LC3)-10

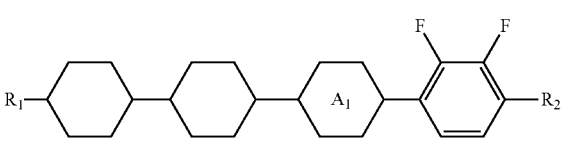
(LC3)-11

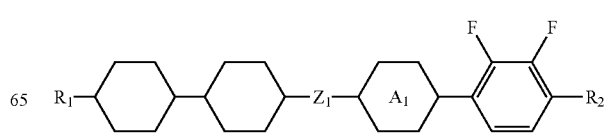
(LC3)-12

-continued (LC3)-13
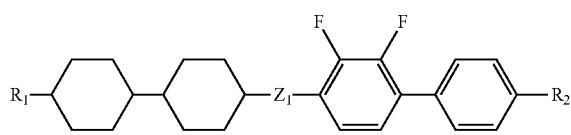

wherein $R_1$, $R_2$, $A_1$ and $Z_1$ have the same meanings as $R_1$, $R_2$, $A_1$ and $Z_1$ of the General Formula (LC3), respectively; and/or the compound of General Formula (LC4) is a compound represented by any one of the following General Formula (LC4)-1 to General Formula (LC4)-6, and the compound of General Formula (LC5) is a compound represented by any one of the following General Formula (LC5)-1 to General Formula (LC5)-4:

[Chemical Formula 5]

(LC4)-1
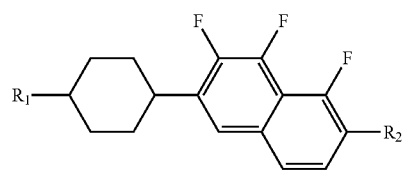

(LC4)-2
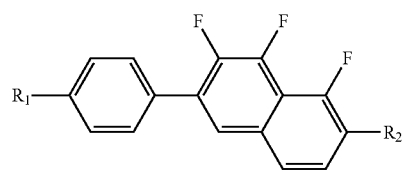

(LC4)-3
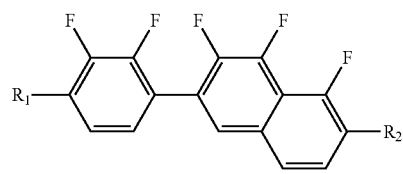

(LC4)-4
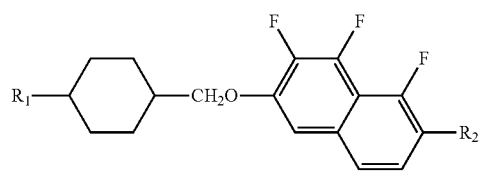

(LC4)-5
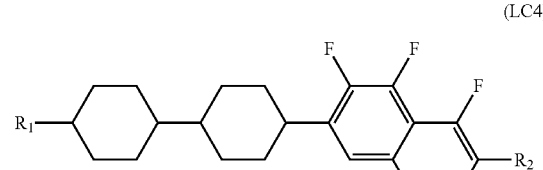

(LC4)-6
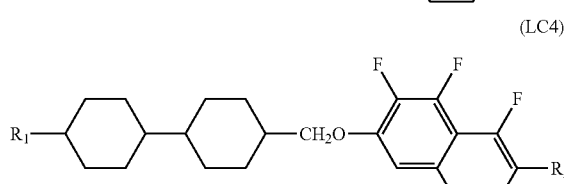

(LC5)-1
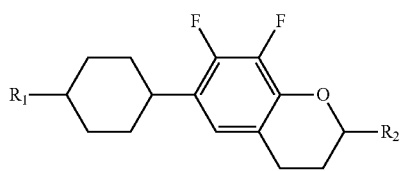

(LC5)-2
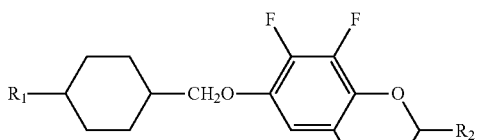

(LC5)-3
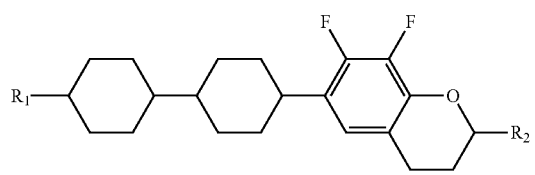

(LC5)-4
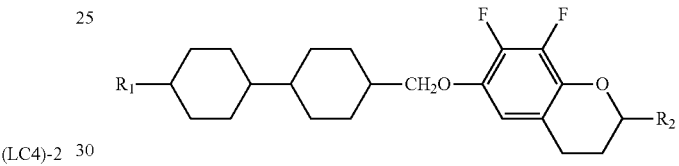

wherein $R_1$ and $R_2$ have the same meanings as $R_1$ and $R_2$ of the General Formulas (LC4) and (LC5), respectively. Even more preferably, the compound is a compound represented by any one of General Formulas (LC3) to (LC5), in which at least one of $Z_1$ and $Z_2$ is —OCF$_2$— or —CF$_2$O—.

Furthermore, it is preferable that the liquid crystal composition layer contain a compound represented by General Formula (LC6):

[Chemical Formula 6]

(LC6)
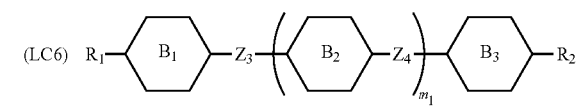

wherein $R_1$ and $R_2$ each independently represent an alkyl group having 1 to 15 carbon atoms; one or two or more CH$_2$ groups in the alkyl group may be substituted by —O—, —CH=CH—, —CO—, —COO—, —COO—, —C≡C—, —CF$_2$O— or —OCF$_2$— such that O atoms are not directly adjacent to each other; one or two or more H atoms in the alkyl group may be optionally substituted by halogen; $B_1$ to $B_3$ each independently represent any one of the following:

[Chemical Formula 7]

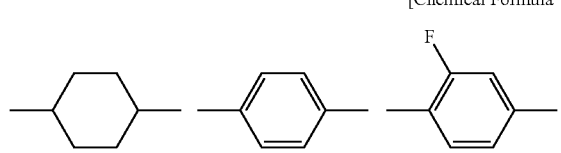

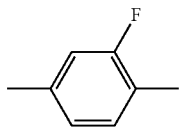

(wherein one or two or more CH$_2$CH$_2$ groups in the cyclohexane ring may be substituted by —CH═CH—, —CF$_2$O— or —OCF$_2$—; and one or two or more CH groups in the benzene ring may be substituted by N atoms); Z$_3$ and Z$_4$ each independently represent a single bond, —CH═CH—, —C≡C—, —CH$_2$CH$_2$—, —(CH$_2$)$_4$—, —COO—, —OCH$_2$—, —CH$_2$O—, —OCF$_2$— or —CF$_2$O—; at least one of Z$_1$ and Z$_2$ is not a single bond; and m$_1$ represents 0 to 3.

The compound represented by General Formula (LC6) is a compound represented by any one of the following General Formula (LC6)-1 to General Formula (LC6)-11:

[Chemical Formula 8]

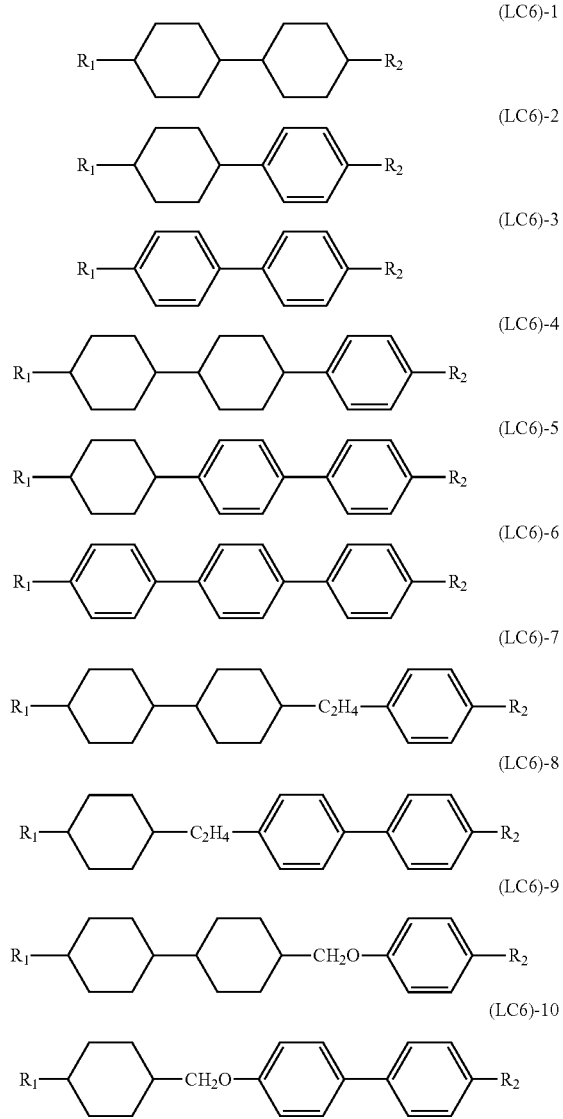

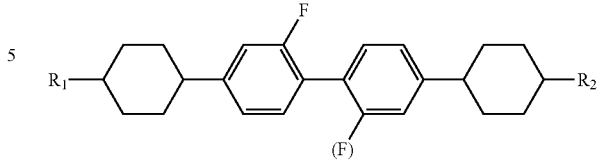

wherein R$_1$ and R$_2$ have the same meanings as R$_1$ and R$_2$ of the General Formula (LC6), respectively. More preferably, the compound may include one kind or two or more kinds of compounds in which R$_1$ and/or R$_2$ in the General Formula (LC6) is an alkenyl group or an alkenyloxy group, and/or any one of Z$_1$ and Z$_2$ in the General Formula (LC6) is —CH═CH—, —C≡C—, —CH$_2$CH$_2$—, —(CH$_2$)$_4$—, —COO—, —OCH$_2$—, —CH$_2$O—, —OCF$_2$— or —CF$_2$O—, and the other is a single bond.

An even more preferred example of the liquid crystal composition contains a compound represented by General Formula (LC6) in an amount of 30% to 70% by mass, and/or two or more kinds of compounds represented by General Formulas (LC1) to (LC5) in which Δ∈ is −4 or less. Particularly preferably, the liquid crystal composition contains two or more kinds of compounds represented by General Formula (LC2) to (LC5) in which Δ∈ is −4 or less, in an amount of 70% to 30% by mass.

The viscosity η of the liquid crystal composition is preferably 20 mPa·s or less at 20° C.

Furthermore, the liquid crystal composition may contain one kind or two or more kinds of polymerizable compounds, and preferably, the polymerizable compound is a disc-shaped liquid crystal compound having a structure in which a benzene derivative, a triphenylene derivative, a truxene derivative, a phthalocyanine derivative or a cyclohexane derivative serves as a parent nucleus at the center of the molecule, and a linear alkyl group, a linear alkoxy group or a substituted benzoyloxy group is radially substituted as a side chain.

Specifically, the polymerizable compound is preferably a polymerizable compound represented by General Formula (PC1):

[Chemical Formula 9]

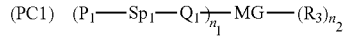

wherein P$_1$ represents a polymerizable functional group; Sp$_1$ represents a spacer group having 0 to 20 carbon atoms; Q$_1$ represents a single bond, —O—, —NH—, —NHCOO—, —OCONH—, —CH═CH—, —CO—, —COO—, —COO—, —OCOO—, —OOCO—, —CH═CH—, —CH═CH—COO—, —OCO—CH═CH— or —C≡C—; n$_1$ and n$_2$ each independently represent 1, 2 or 3; MG represents a mesogen group or a mesogenic supporting group; R$_3$ represents a halogen atom, a cyano group or an alkyl group having 1 to 25 carbon atoms; one or two or more CH$_2$ groups in the alkyl group may be substituted by —O—, —S—, —NH—, —N(CH$_3$)—, —CO—, —COO—, —OCO—, —OCOO—, —SCO—, —COS— or —C≡C— such that O atoms are not directly adjacent to each other; or R$_3$ represents P$_2$-Sp$_2$-Q$_2$- (wherein P$_2$, Sp$_2$ and Q$_2$ each independently have the same meanings as P$_1$, Sp$_1$ and Q$_1$)).

More preferably, the polymerizable compound is a polymerizable compound in which MG in General Formula (PC1) is represented by the following structure:

[Chemical Formula 10]

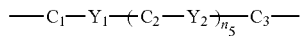

wherein $C_1$ to $C_3$ each independently represent a 1,4-phenylene group, a 1,4-cyclohexylene group, a 1,4-cyclohexenyl group, a tetrahydropyrane-2,5-diyl group, a 1,3-dioxane-2,5-diyl group, a tetrahydrothiopyrane-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, and fluorene-2,7-diyl group may have, as substituents, one or more of F, Cl, $CF_3$, $OCF_3$, a cyano group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, or an alkenoyloxy group; $Y_1$ and $Y_2$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2COO$—, —$CH_2CH_2OCO$—, —$COOCH_2CH_2$—, —$OCOCH_2CH_2$—, —CONH—, —NHCO— or a single bond; and $n_5$ represents 0, 1 or 2. $Sp_1$ and $Sp_2$ each independently represent an alkylene group, and the alkylene group may be substituted with one or more halogen atoms or CN. One or two or more $CH_2$ groups that are present in this group may be substituted by —O—, —S—, —NH—, —N($CH_3$)—, —CO—, —COO—, —OCO—, —OCOO—, —SCO—, —COS— or —C≡C— such that O atoms are not directly adjacent to each other, and $P_1$ and $P_2$ are each independently represented by any one of the following General Formula (PC1-a) to General Formula (PC1-d):

[Chemical Formula 11]

(PC1-a)

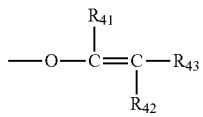

(PC1-b)

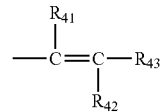

(PC1-c)

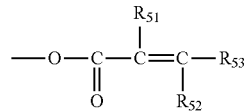

(PC1-d)

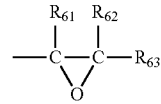

wherein $R_{41}$ to $R_{43}$, $R_{51}$ to $R_{53}$, and $R_{61}$ to $R_{63}$ each independently represent a hydrogen atom, a halogen atom, or an alkyl group having 1 to 5 carbon atoms. More specifically, the polymerizable compound is preferably a polymerizable compound in which General Formula (PC1) is represented by General Formula (PC1)-1 or General Formula (PC1)-2:

[Chemical Formula 12]

(PC1)-1

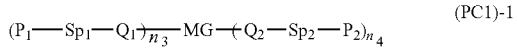

(PC1)-2

wherein $P_1$, $Sp_1$, $Q_1$, $P_2$, $Sp_2$, $Q_2$ and MG have the same meanings as $P_1$, $Sp_1$, $Q_1$, $P_2$, $Sp_2$, $Q_2$ and MG of General Formula (PC1); and $n_3$ and $n_4$ each independently represent 1, 2 or 3.

More specifically, the polymerizable compound is more preferably a polymerizable compound in which General Formula (PC1) is represented by any one of General Formula (PC1)-3 to General Formula (PC1)-8:

[Chemical Formula 13]

(PC1)-3

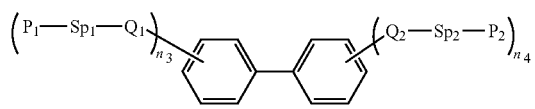

(PC1)-4

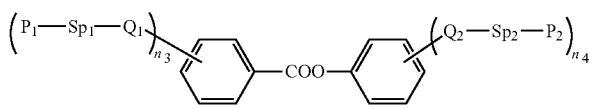

(PC1)-5

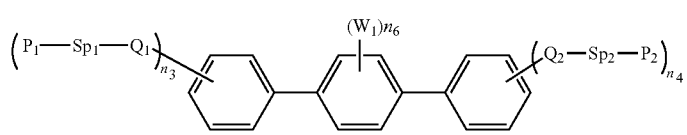

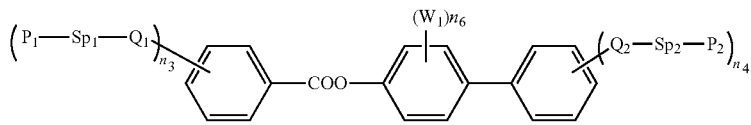

(PC1)-6

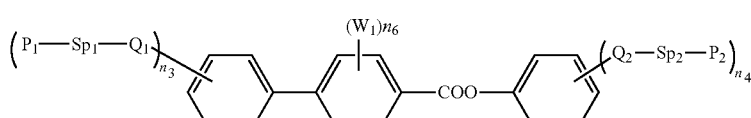

(PC1)-7

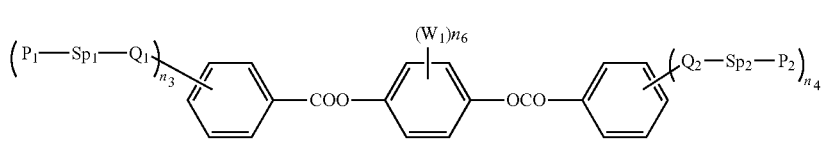

(PC1)-8 wherein $W_1$ each independently represents F, $CF_3$, $OCF_3$, $CH_3$, $OCH_3$, an alkyl group having 2 to 5 carbon atoms, an alkoxy group, an alkenyl group, $COOW_2$, $OCOW_2$ or $OCOOW_2$ (wherein $W_2$ represents a linear or branched alkyl group having 1 to 10 carbon atoms, or an alkenyl group having 2 to 5 carbon atoms); and $n_6$ represents 0, 1, 2, 3 or 4.

Even more preferably, $Sp_1$, $Sp_2$, $Q_1$ and $Q_2$ in the General Formula (PC1) for the polymerizable compound are all single bonds; $n_3$ and $n_4$ are such that $n_3+n_4$ is from 3 to 6; $P_1$ and $P_2$ are represented by formula (7-b); $W_1$ is F, $CF_3$, $OCF_3$, $CH_3$ or $OCH_3$; and $n_6$ represents 1, 2, 3 or 4.

Furthermore, the polymerizable compound is also preferably a disc-shaped liquid crystal compound in which MG in General Formula (PC1) is represented by General Formula (PC1)-9:

[Chemical Formula 14]

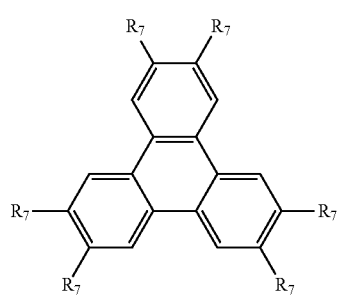

(PC1)-9

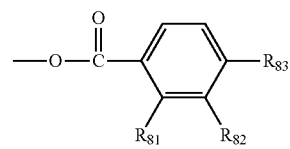

(PC1-e)

wherein $R_2$ each independently represents $P_1$-$Sp_1$-$Q_1$ or a substituent of General Formula (PC1-e) (wherein $P_1$, $Sp_1$ and $Q_1$ have the same meanings as $P_1$, $Sp_1$ and $Q_1$ of General Formula (PC1), respectively); $R_{81}$ and $R_{82}$ each independently represent a hydrogen atom, a halogen atom or a methyl group; $R_{83}$ represents an alkoxy group having 1 to 20 carbon atoms; and at least one hydrogen atom in the alkoxy group is substituted by a substituent represented by any one of the General Formulas (PC1-a) to (PC1-d).

The amount of use of the polymerizable compound is preferably 0.05% to 2.0% by mass.

The liquid crystal composition can be used alone for the applications described above, may further include one kind or two or more kinds of oxidation inhibitors, or may further include one kind or two or more kinds of UV absorbers.

The product (Δn·d) of the refractive index anisotropy (Δn) of the liquid crystal composition with the distance (d) between the first substrate and the second substrate of a display device is, in the case of a vertical alignment, preferably 0.20 to 0.59; in the case of a hybrid alignment, preferably 0.21 to 0.61; in the case of a vertical alignment, particularly preferably 0.30 to 0.40; and in the case of a hybrid alignment, particularly preferably 0.32 to 0.44.

On each of the surfaces that are brought into contact with the liquid crystal composition on the first substrate and the second substrate of the display device, an alignment film formed from a polyimide (PI), a polyamide, a chalcone, a cinnamate, a cinnamoyl or the like can be provided so as to align the liquid crystal composition, and the alignment film may also be a film produced using a photo-alignment technology.

In the case of a vertical alignment, the tilt angle of the long axis of the liquid crystal molecules in the liquid crystal composition on the substrate surface is preferably 85° to 90°, and in the case of a hybrid alignment, the tilt angle of the long axis of the liquid crystal molecules in the liquid crystal composition on the substrate surface of one of the first substrate and the second substrate is preferably 85° to 90°, while the tilt angle of the long axis of the liquid crystal molecules on the other substrate surface is preferably 3° to 20°.

EXAMPLES

Hereinafter, some of the best modes of the invention will be described in detail by way of Examples, but the invention is not intended to be limited to these Examples. Furthermore, the unit "percent (%)" for the compositions of the following Examples and Comparative Examples means "percent (%) by mass".

The properties of the liquid crystal composition will be indicated as follows.

$T_{N-I}$: Nematic phase-isotropic liquid phase transition temperature (° C.) as the upper limit temperature of the liquid crystal phase Δ∈: Dielectric anisotropy Δn: Refractive index anisotropy Vsat: Applied voltage at which the transmittance changes by 90% when square waves are applied at a frequency of 1 kHz The following abbreviations are used for the indication of compounds.

| n (number) at the end | $C_nH_{2n+1}$— |
| --- | --- |
| -2- | —$CH_2CH_2$— |
| -1O- | —$CH_2O$— |
| -O1- | —$OCH_2$— |
| -On | —$OC_nH_{2n+1}$ |
| -1=1- | —HC=CH— |
| ndm- | $C_nH_{2n+1}$—HC=CH—$(CH_2)_{m-1}$— |

[Chemical Formula 15]

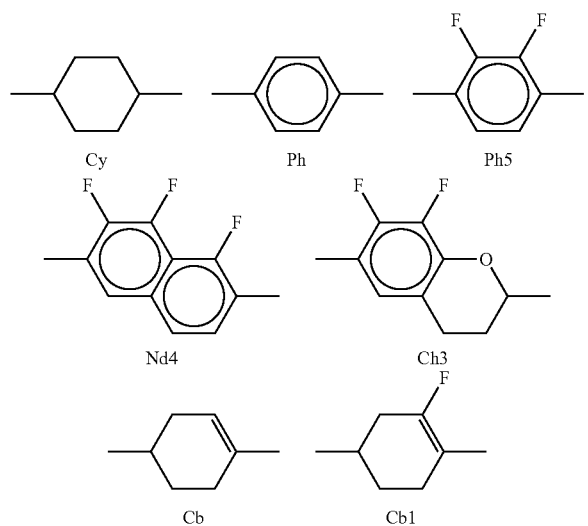

Example 1

Figure 4:
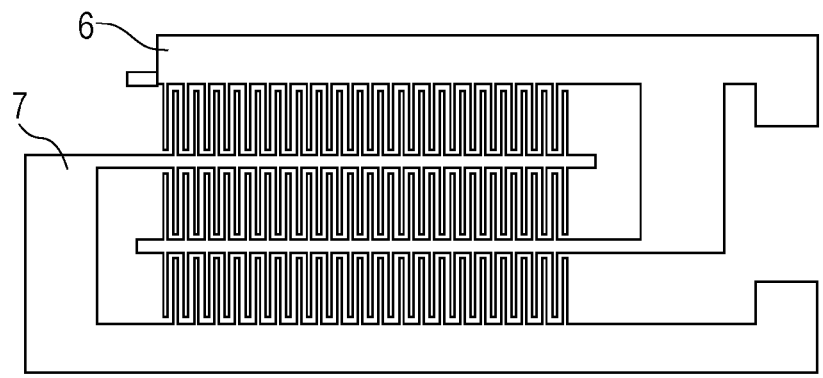
FIG. 4 is a diagram illustrating the electrode configuration of a test cell.
Figure 5:
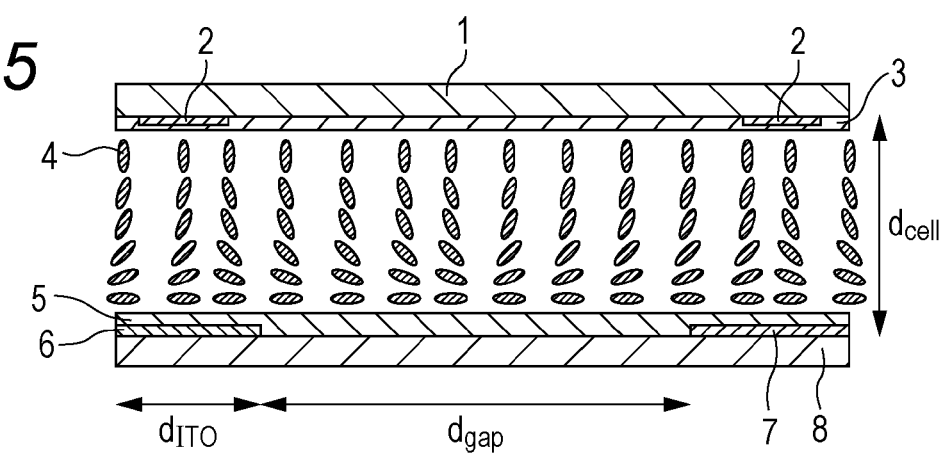
FIG. 5 is a diagram illustrating the state of alignment of liquid crystal molecules without voltage application (example 1 of n-HBIPS)
Figure 6:
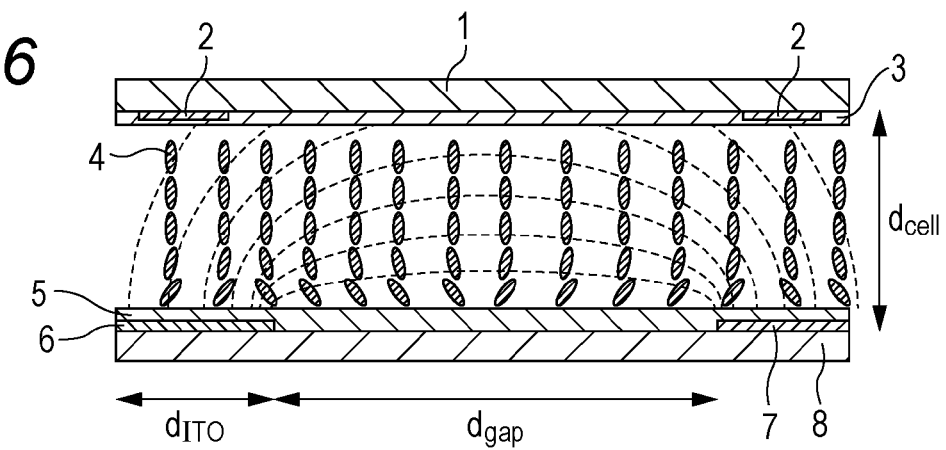
FIG. 6 is a diagram illustrating the state of realignment of liquid crystal molecules upon voltage application (example 1 of n-HBIPS)
Figure 7:
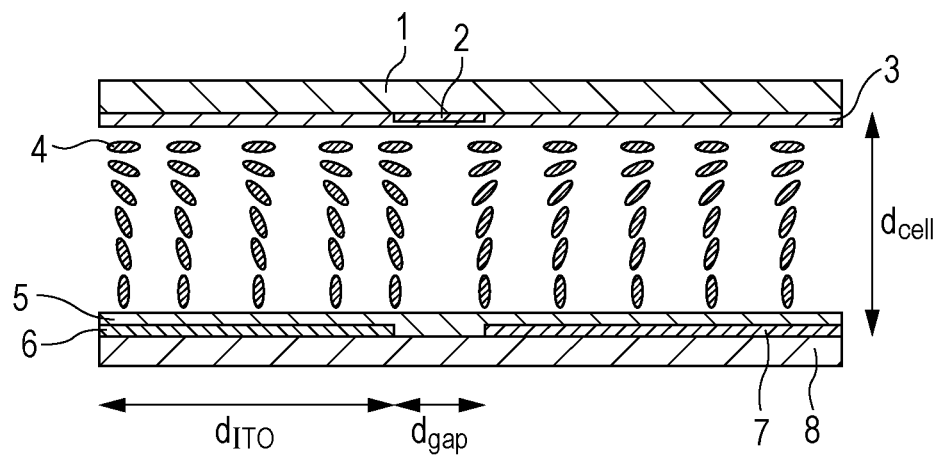
FIG. 7 is a diagram illustrating the state of alignment of liquid crystal molecules without voltage application (example 2 of n-HBIPS)
Figure 8:
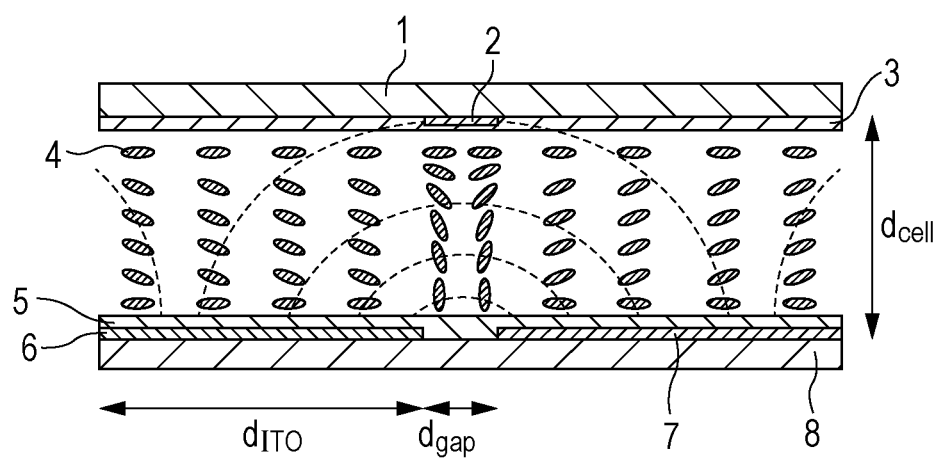
FIG. 8 is a diagram illustrating the state of realignment of liquid crystal molecules upon voltage application (example 2 of n-HBIPS).

An electrode structure such as illustrated in FIG. 4 was produced on a second substrate, and a first substrate having no electrode structure provided thereon was used. An alignment film of vertical alignment was formed on each of the respective surfaces that faced each other. The liquid crystals having negative dielectric anisotropy indicated as Example 1 in Table 1 were interposed between the first substrate and the second substrate, and thus a liquid crystal display device was produced (cell thickness: 4.0 μm, alignment film: SE-5300).

Comparative Example 1

A conventional VA liquid crystal display device was produced using the liquid crystal composition used in Example 1, and the property values were measured. The results are presented together in Table 1.

The liquid crystal display device of the invention realized a higher response speed, a larger amount of light transmission, a reduction in light leakage caused by external pressure, a wider viewing angle, and a higher contrast ratio, as compared with the liquid crystal display device of Comparative Example 1 in which the same liquid crystals having negative dielectric anisotropy were interposed.

Example 2

An electrode structure such as illustrated in FIG. 4 was produced on a second substrate, and a first substrate having no electrode structure provided thereon was used. An alignment film of vertical alignment was formed on each of the other sides of the respective surfaces that faced each other, and an alignment film of horizontal orientation was formed on each of the reverse sides. The liquid crystals having negative dielectric anisotropy indicated as Example 2 in Table 1 were interposed between the first substrate and the second substrate, and thus a liquid crystal display device was produced (cell thickness: 4.0 μm, alignment films: SE-5300, AL-1051). The liquid crystal display device realized a higher response speed, a larger amount of light transmission, a reduction in light leakage caused by external pressure, a wider viewing angle, and a higher contrast ratio, as compared with a conventional VA liquid crystal display device in which the same liquid crystals having negative dielectric anisotropy were interposed.

Example 3

An electrode structure such as illustrated in FIG. 4 was produced on a second substrate, and a first substrate having no electrode structure provided thereon was used. An alignment film of vertical alignment was formed on each of the respective surfaces that faced each other. The liquid crystals having negative dielectric anisotropy indicated as Example 3 in Table 1 and 0.3% by mass of 2-methylacrylic acid 4'-{2-[4-(2-acryloyloxyethyl)phenoxycarbonyl]ethyl}biphenyl-4-yl ester were interposed between the first substrate and the second substrate, and thus a liquid crystal display device was produced (cell thickness: 4.0 μm, alignment film: SE-5300). While a driving voltage was applied between the electrodes, ultraviolet radiation was irradiated for 600 seconds (3.0 J/cm²), and thus a polymerization treatment was carried out.

The liquid crystal display device realized a higher response speed, a larger amount of light transmission, a reduction in light leakage caused by external pressure, a wider viewing angle, and a higher contrast ratio, as compared with a conventional VA liquid crystal display device in which the same liquid crystals having negative dielectric anisotropy were interposed.

Example 4

An electrode structure such as illustrated in FIG. 4 was produced on a second substrate, and a first substrate having no electrode structure provided thereon was used. An alignment film of vertical alignment was formed on each of the other sides of the respective surfaces that faced each other, and an alignment film of horizontal orientation was formed on each of the reverse sides. The liquid crystals having negative dielectric anisotropy indicated as Example 4 in Table 1 were interposed between the first substrate and the second substrate, and thus a liquid crystal display device was produced (cell thickness: 4.0 μm, alignment films: SE-5300, AL-1051). While a driving voltage was applied between the electrodes, ultraviolet radiation was irradiated for 600 seconds (3.0 J/cm²), and thus a polymerization treatment was carried out.

The liquid crystal display device realized a higher response speed, a larger amount of light transmission, a reduction in light leakage caused by external pressure, a wider viewing angle, and a higher contrast ratio, as compared with a conventional VA liquid crystal display device in which the same liquid crystals having negative dielectric anisotropy were interposed.

TABLE 1

|  | Example 1 | Example 2 | Example 3 | Example 4 | Comparative Example 1 |
|---|---|---|---|---|---|
| 0d1-Cy-Cy-3 | 20 | 20 | 20 | 20 | 20 |
| 3-Cy-Cy-2 | 15 | 15 | 15 | 15 | 15 |
| 3-Cy-Ph-O1 | 5 | 5 | 5 | 5 | 5 |
| 0d1-Cy-1O-Ph5-O1-Cy-2 | 11 | 11 | 11 | 11 | 11 |
| 0d1-Cy-1O-Ph5-O1-Cy-3 | 11 | 11 | 11 | 11 | 11 |
| 0d1-Cy-1O-Ph5-O1-Cy-4 | 11 | 11 | 11 | 11 | 11 |
| 0d1-Cy-1O-Ph5-O1-Cy-5 | 11 | 11 | 11 | 11 | 11 |
| 0d1-Cy-Cy-1O-Ph5-O3d0 | 4 | 4 | 4 | 4 | 4 |
| 0d1-Cy-Cy-1O-Ph5-O4d0 | 4 | 4 | 4 | 4 | 4 |
| 0d1-Cy-1O-Ph5-O1-Cy-Cy-2 | 4 | 4 | 4 | 4 | 4 |
| 0d1-Cy-1O-Ph5-O1-Cy-Cy-3 | 4 | 4 | 4 | 4 | 4 |
| Sum of composition ratios (%) | 100 | 100 | 100 | 100 | 100 |
| Tni/° C. | 82.4 | 82.4 | 82.4 | 82.4 | 82.4 |
| Δn (20°) | 0.074 | 0.074 | 0.074 | 0.074 | 0.074 |
| η20/mPa · s | 16.1 | 16.1 | 16.1 | 16.1 | 16.1 |
| Δε (20° C.) | −4.7 | −4.7 | −4.7 | −4.7 | −4.7 |
| Vsat/V (25° C.) | 4.32 | 4.13 | 4.18 | 4.10 | 4.78 |
| τr+d/msec (25° C., 6 V) | 3.7 | 4.1 | 4.3 | 4.4 | 19.6 |

Examples 5 and 6

A liquid crystal display device of Example 5 was produced in the same manner as in Example 1 by interposing the liquid crystals having negative dielectric anisotropy indicated in Table 2, and a liquid crystal display device of Example 6 was produced in the same manner as in Example 1.

TABLE 2

|  | Example 5 | Example 6 |
|---|---|---|
| 3-Cy-1O-Ph5-O2 | 11 | 11 |
| 5-Cy-1O-Ph5-O2 | 10 | 10 |
| 0d1-Cy-Cy-3 | 20 |  |
| 0d1-Cy-Cy-5 |  | 20 |
| 0d3-Cy-Cy-3 | 10 | 10 |
| 3-Cy-1=1-Cy-3 | 10 | 10 |
| 3-Cy-Cy-2 |  |  |
| 3-Cy-Ph-O1 |  |  |
| 0d1-Cy-1O-Ph5-O1-Cy-2 |  |  |
| 0d1-Cy-1O-Ph5-O1-Cy-3 |  | 5 |
| 0d1-Cy-1O-Ph5-O1-Cy-4 |  |  |
| 0d1-Cy-1O-Ph5-O1-Cy-5 |  |  |
| 0d1-Cy-Cy-1O-Ph5-O3d0 |  | 5 |
| 0d1-Cy-Cy-1O-Ph5-O4d0 |  | 5 |
| 2-Cy-Cy-1O-Ph5-O2 | 5 | 5 |
| 3-Cy-Cy-1O-Ph5-O2 | 12 | 12 |
| 4-Cy-Cy-1O-Ph5-O2 | 5 | 5 |
| 0d1-Cy-1O-Ph5-O1-Cy-Cy-1d0 | 12 |  |
| 0d1-Cy-1O-Ph5-O1-Cy-Cy-2 | 5 |  |
| 0d1-Cy-1O-Ph5-O1-Cy-Cy-3 |  | 2 |
| Sum of composition ratios (%) | 100 | 100 |
| Tni/° C. | 79.6 | 78.9 |
| Δn (20°) | 0.074 | 0.075 |
| η20/mPa · s | 17.8 | 18.2 |
| Δε (20° C.) | −4.8 | −4.8 |
| Vsat/V (25° C.) | 4.24 | 4.27 |
| τr + d/msec (25° C., 6 V) | 3.7 | 3.8 |

The liquid crystal display devices of Examples 5 and 6 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 7 to 10

A liquid crystal display device of Example 7 was produced in the same manner as in Example 1 by interposing the liquid crystals having negative dielectric anisotropy indicated in Table 3; a liquid crystal display device of Example 8 was produced in the same manner as in Example 1; a liquid crystal display device of Example 9 was produced in the same manner as in Example 1; and a liquid crystal display device of Example 10 was produced in the same manner as in Example 1.

TABLE 3

|  | Example 7 | Example 8 | Example 9 | Example 10 |
|---|---|---|---|---|
| 0d1-Cy-1O-Ph5-O3d0 |  |  |  | 5 |
| 0d1-Cy-1O-Ph5-O4d0 |  |  |  | 5 |
| 0d1-Cy-Cy-3 | 10 |  |  | 4 |
| 3-Cy-Cy-2 | 10 | 18 |  | 10 |
| 3-Cy-Cy-4 |  | 6 | 15 | 3 |
| 3-Cy-Ph-O2 | 12 | 12 | 15 | 4 |
| 5-Ph-Ph-1 | 10 | 3 | 3 | 10 |
| 0d1-Cy-1O-Ph5-O1-Cy-2 | 10 | 10 | 10 |  |
| 0d1-Cy-1O-Ph5-O1-Cy-3 | 12 | 12 | 12 |  |
| 0d1-Cy-1O-Ph5-O1-Cy-4 | 12 | 12 | 12 |  |
| 0d1-Cy-1O-Ph5-O1-Cy-5 | 10 | 10 | 10 |  |
| 0d1-Cy-Cy-1O-Ph5-O1d0 |  |  |  | 10 |
| 0d1-Cy-Cy-1O-Ph5-O2d0 |  |  |  | 10 |
| 0d1-Cy-Cy-1O-Ph5-O3d0 |  |  |  | 15 |
| 0d1-Cy-Cy-1O-Ph5-O4d0 |  |  |  | 15 |
| 3-Cy-Cy-Ph-1 | 6 | 3 |  | 6 |
| 0d1-Cy-1O-Ph5-O1-Cy-Cy-2 | 4 | 4 | 4 |  |
| 0d1-Cy-1O-Ph5-O1-Cy-Cy-3 | 4 | 4 | 4 |  |
| Sum of composition ratios (%) | 100 | 100 | 100 | 100 |
| Tni/° C. | 75.5 | 81.8 | 83.5 | 75.1 |
| Δn (20°) | 0.088 | 0.077 | 0.078 | 0.087 |
| η20/mPa · s | 16 | 16.5 | 20.2 | 15.5 |
| Δε (20° C.) | −4.2 | −4.2 | −4.2 | −4.3 |
| Vsat/V (25° C.) | 4.52 | 4.57 | 4.55 | 4.50 |
| τr + d/msec (25° C., 6 V) | 3.6 | 3.6 | 3.8 | 3.5 |

The liquid crystal display devices of Examples 7 to 10 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 11 to 13

A liquid crystal display device of Example 11 was produced in the same manner as in Example 1 by interposing the liquid crystals having negative dielectric anisotropy indicated in Table 4; a liquid crystal display device of Example 12 was produced in the same manner as in Example 1; and a liquid crystal display device of Example 13 was produced in the same manner as in Example 1.

TABLE 4

|  | Example 11 | Example 12 | Example 13 |
|---|---|---|---|
| 2-Cy-2-Nd4-O2 |  | 4 | 4 |
| 2-Cy-2-Nd4-O4 |  | 4 | 4 |
| 3-Cy-1O-Ch3-5 | 3 |  |  |
| 3-Cy-1O-Nd4-O4 | 3 | 4 | 4 |
| 5-Cy-1O-Ch3-5 | 3 |  |  |
| 5-Cy-1O-Nd4-O2 | 2 |  |  |
| 5-Cy-1O-Nd4-O3 | 3 | 4 | 4 |
| 0d1-Cy-Cy-5 |  | 23 |  |
| 0d3-Cy-Cy-3 |  | 10 |  |
| 1d1-Cy-Cy-3 |  | 8 |  |
| 3-Cy-Cy-2 | 15 |  |  |
| 3-Cy-Cy-4 | 7 | 6 | 22 |
| 3-Cy-Cy-5 | 7 |  | 22 |
| 3-Cy-Ph-2 |  | 15 | 15 |
| 3-Cy-Ph-O1 | 5 |  |  |
| 3-Cy-Ph-O2 | 5 |  |  |
| 5-Ph-Ph-1 | 6 |  |  |
| 2-Cy-Cy-1O-Nd4-O2 | 3 | 4 | 4 |
| 2-Cy-Cy-1O-Nd4-O4 | 2 | 4 | 4 |
| 3-Cy-2-Cy-1O-Nd4-O2 | 4 |  |  |
| 3-Cy-2-Cy-1O-Nd4-O3 | 4 |  |  |
| 3-Cy-Cy-1O-Ch3-5 | 3 |  |  |
| 3-Cy-Cy-1O-Nd4-O4 | 3 | 4 | 4 |
| 4-Cy-Cy-1O-Ch3-5 | 3 |  |  |
| 4-Cy-Cy-1O-Nd4-O2 | 2 | 4 | 4 |
| 4-Cy-Cy-2-Nd4-O2 |  | 6 | 6 |
| 3-Cy-Cy-Ph-1 | 8 |  | 3 |
| Sum of composition ratios (%) | 100 | 100 | 100 |
| Tni/° C. | 92 | 90 | 91 |
| Δn (20°) | 0.093 | 0.092 | 0.093 |
| η20/mPa · s | 24.9 | 24.1 | 25.5 |
| Δε (20° C.) | −3.3 | −3.2 | −3.2 |
| Vsat/V (25° C.) | 5.16 | 5.32 | 5.28 |
| τr + d/msec (25° C., 6 V) | 4.7 | 4.7 | 4.8 |

The liquid crystal display devices of Examples 11 to 13 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 14 and 15

A liquid crystal display device of Example 14 was produced in the same manner as in Example 1 by interposing the liquid crystals having negative dielectric anisotropy indicated in Table 5, and a liquid crystal display device of Example 15 was produced in the same manner as in Example 1.

TABLE 5

|  | Example 14 | Example 15 |
|---|---|---|
| 3-Cy-1O-Ch3-5 | 2 |  |
| 3-Cy-2-Ph5-O2 | 6 | 10 |
| 3-Cy-Ph5-O2 |  | 10 |
| 4-Cy-1O-Nd4-O2 | 5 | 5 |
| 5-Cy-1O-Ch3-5 | 2 |  |
| 0d1-Cy-Cy-5 |  | 16 |
| 3-Cy-1=1-Cy-3 |  | 10 |
| 3-Cy-Cy-2 | 15 |  |
| 3-Cy-Cy-4 | 7 |  |
| 3-Cy-Cy-5 | 7 |  |
| 3-Cy-Ph-O1 | 6 |  |
| 3-Cy-2-Cy-1O-Nd4-O2 | 3 |  |
| 3-Cy-2-Cy-1O-Nd4-O3 | 3 |  |
| 3-Cy-Cy-1O-Ch3-5 | 2 |  |
| 3-Cy-Cy-2-Ph5-O2 | 7 | 10 |
| 3-Cy-Cy-Ph5-1 | 7 | 10 |
| 3-Cy-Cy-Ph5-O2 | 7 | 10 |
| 4-Cy-Cy-1O-Ch3-5 | 2 |  |
| 5-Cy-Cy-1O-Nd4-O3 | 5 | 5 |
| 0d1-Cy-Cy-Ph-1 |  | 14 |
| 3-Cy-Cy-Ph-1 | 14 |  |
| Sum of composition ratios | 100 | 100 |
| Tni/° C. | 87 | 85 |
| Δn (20°) | 0.086 | 0.085 |
| η20/mPa · s | 24.2 | 23.8 |
| Δε (20° C.) | −2.7 | −2.5 |
| Vsat/V (25° C.) | 5.72 | 5.81 |
| τr + d/msec (25° C., 6 V) | 4.7 | 4.7 |

The liquid crystal display devices of Examples 14 and 15 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 16 to 18

A liquid crystal display device of Example 16 was produced in the same manner as in Example 1 by interposing the liquid crystals having negative dielectric anisotropy indicated in Table 6; a liquid crystal display device of Example 17 was produced in the same manner as in Example 1; and a liquid crystal display device of Example 18 was produced in the same manner as in Example 1.

TABLE 6

|  | Example 16 | Example 17 | Example 18 |
|---|---|---|---|
| 3-Cy-1O-Ch3-5 | 3 |  |  |
| 3-Cy-1O-Nd4-O4 | 3 |  | 4 |
| 5-Cy-1O-Ch3-5 | 3 |  |  |
| 5-Cy-1O-Nd4-O2 | 2 | 4 | 4 |
| 5-Cy-1O-Nd4-O3 | 3 | 4 | 4 |
| 3-Cy-Cy-2 | 7 | 21 | 11 |
| 3-Cy-Cy-4 | 11 | 7 | 7 |
| 3-Cy-Cy-5 | 11 | 7 | 7 |
| 3-Cy-Ph-2 |  |  | 6 |
| 3-Cy-Ph-O1 | 7 | 13 | 7 |
| 3-Cy-Ph-O2 | 7 | 13 | 7 |
| 5-Ph-Ph-1 | 6 |  | 13 |
| 2-Cy-Cy-1O-Nd4-O2 | 3 | 4 | 4 |
| 2-Cy-Cy-1O-Nd4-O4 | 2 |  |  |
| 3-Cy-2-Cy-1O-Nd4-O2 | 3 | 4 | 4 |
| 3-Cy-2-Cy-1O-Nd4-O3 | 3 | 4 | 4 |
| 3-Cy-Cy-1O-Ch3-5 | 2 | 3 |  |
| 3-Cy-Cy-1O-Nd4-O4 | 3 | 4 | 4 |
| 4-Cy-Cy-1O-Ch3-5 | 2 | 3 |  |
| 4-Cy-Cy-1O-Nd4-O2 | 2 |  |  |

TABLE 6-continued

|  | Example 16 | Example 17 | Example 18 |
|---|---|---|---|
| 3-Cy-Cy-Ph-1 | 8 | 9 | 6 |
| 3-Cy-Ph-Ph-1 | 9 |  | 6 |
| Sum of composition ratios (%) | 100 | 100 | 98 |
| Tni/° C. | 86 | 81 | 76 |
| Δn (20°) | 0.091 | 0.082 | 0.104 |
| η20/mPa·s | 20 | 19.2 | 17.8 |
| Δε (20° C.) | −2.7 | −2.5 | −2.3 |
| Vsat/V (25° C.) | 5.71 | 5.93 | 6.12 |
| τr + d/msec (25° C., 6 V) | 3.7 | 3.6 | 3.7 |

The liquid crystal display devices of Examples 16 to 18 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 19 to 22

A liquid crystal display device of Example 19 was produced in the same manner as in Example 1 by interposing the liquid crystals having negative dielectric anisotropy indicated in Table 7; a liquid crystal display device of Example 20 was produced in the same manner as in Example 1; a liquid crystal display device of Example 21 was produced in the same manner as in Example 1; and a liquid crystal display device of Example 22 was produced in the same manner as in Example 1.

TABLE 7

|  | Example 19 | Example 20 | Example 21 | Example 22 |
|---|---|---|---|---|
| 3-Cy-1O-Ph5-O2 |  | 2 |  | 11 |
| 5-Cy-1O-Ph5-O2 |  | 2 |  | 10 |
| 0d1-Cy-Cy-3 |  |  | 30 |  |
| 0d1-Cy-Cy-5 | 4 | 4 | 10 | 20 |
| 0d3-Cy-Cy-3 |  |  |  | 10 |
| 3-Cy-1=1-Cy-3 |  |  |  | 10 |
| 3-Cy-Cy-2 | 4 | 4 |  |  |
| 3-Cy-Cy-4 | 4 | 4 |  |  |
| 3-Cy-Cy-5 | 4 | 4 |  |  |
| 3-Cy-Ph-O1 | 2 | 2 |  |  |
| 5-Ph-Ph-1 | 20 | 20 |  |  |
| 0d1-Cy-1O-Ph5-O1-Cy-1d0 |  |  |  | 12 |
| 0d1-Cy-1O-Ph5-O1-Cy-2 | 7 | 8 | 10 |  |
| 0d1-Cy-1O-Ph5-O1-Cy-3 | 7 | 8 | 12 |  |
| 0d1-Cy-1O-Ph5-O1-Cy-4 | 7 | 8 | 12 |  |
| 0d1-Cy-1O-Ph5-O1-Cy-5 | 5 |  | 10 |  |
| 0d1-Cy-Cy-1O-Ph5-O3d0 | 13 |  | 6 |  |
| 0d1-Cy-Cy-1O-Ph5-O4d0 | 13 |  | 6 |  |
| 2-Cy-Cy-1O-Ph5-O2 |  | 13 |  | 5 |
| 3-Cy-Cy-1O-Ph5-O2 |  | 13 |  | 12 |
| 4-Cy-Cy-1O-Ph5-O2 |  | 13 |  | 5 |
| 0d1-Cy-1O-Ph5-O1-Cy-Cy-2 | 5 |  | 2 | 5 |
| 0d1-Cy-1O-Ph5-O1-Cy-Cy-3 | 5 | 5 | 2 |  |
| Sum of composition ratios (%) | 100 | 110 | 100 | 100 |
| Tni/° C. | 80.5 | 79.8 | 83.6 | 83.1 |
| Δn (20°) | 0.102 | 0.101 | 0.075 | 0.075 |
| η20/mPa·s | 23.9 | 27.6 | 15.1 | 18 |
| Δε (20° C.) | −4.1 | −4.1 | −4.8 | −4.8 |
| Vsat/V (25° C.) | 4.54 | 4.42 | 4.08 | 4.12 |
| τr + d/msec (25° C., 6 V) | 4.8 | 5.0 | 3.4 | 3.6 |

The liquid crystal display devices of Examples 19 to 22 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 23 to 26

A liquid crystal display device of Example 23 was produced in the same manner as in Example 1 by interposing the liquid crystals having negative dielectric anisotropy indicated in Table 8; a liquid crystal display device of Example 24 was produced in the same manner as in Example 1; a liquid crystal display device of Example 25 was produced in the same manner as in Example 1; and a liquid crystal display device of Example 26 was produced in the same manner as in Example 1.

TABLE 8

|  | Example 23 | Example 24 | Example 25 | Example 26 |
|---|---|---|---|---|
| 2-Cy-2-Nd4-O2 |  | 10 |  | 10 |
| 3-Cy-1O-Ch3-O5 | 7 |  | 10 |  |
| 3-Cy-2-Nd4-O4 |  | 10 |  | 10 |
| 4-Cy-2-Nd4-O2 |  | 10 |  | 10 |
| 5-Cy-1O-Ch3-O5 | 7 |  | 10 |  |
| 5-Cy-2-Nd4-O2 |  | 5 |  | 5 |
| 0d1-Cy-Cy-3 | 30 | 40 |  |  |
| 0d1-Cy-Cy-5 |  |  | 15 | 20 |
| 3-Cy-Cy-4 |  |  | 15 | 14 |
| 3-Cy-Ph-O2 |  |  |  | 10 |
| 5-Ph-Ph-1 | 10 |  | 10 |  |
| 2-Cy-Cy-2-Nd4-O2 |  | 4 |  | 4 |
| 3-Cy-Cy-1O-Ph5-O1 | 4 |  | 3 |  |
| 3-Cy-Cy-1O-Ph5-O2 | 9 |  | 5 |  |
| 3-Cy-Cy-2-Ph5-O2 | 10 |  | 10 |  |
| 3-Cy-Cy-Ph5-O2 | 10 |  | 10 |  |
| 4-Cy-Cy-1O-Ph5-O1 | 4 |  | 3 |  |
| 4-Cy-Cy-2-Nd4-O2 |  | 4 |  | 4 |
| 0d1-Cy-Cy-Ph-1 | 9 | 6 | 9 | 4 |
| 0d1-Cy-Ph-Ph-3 |  | 5 |  | 3 |
| 0d3-Cy-Cy-Ph-1 |  | 6 |  | 6 |
| Sum of composition ratios (%) | 100 | 100 | 100 | 100 |
| Tni/° C. | 82.7 | 82.3 | 80.9 | 81.8 |
| Δn (20°) | 0.087 | 0.098 | 0.084 | 0.097 |
| η20/mPa·s | 19.4 | 18.1 | 26 | 22.7 |
| Δε (20° C.) | −3.1 | −3.1 | −3.1 | −3.2 |
| Vsat/V (25° C.) | 5.37 | 5.29 | 5.42 | 5.25 |
| τr + d/msec (25° C., 6 V) | 3.7 | 3.6 | 4.9 | 4.6 |

The liquid crystal display devices of Examples 23 to 26 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 27 to 29

A liquid crystal display device of Example 27 was produced in the same manner as in Example 1 by interposing the liquid crystals having negative dielectric anisotropy indicated in Table 9; a liquid crystal display device of Example 28 was produced in the same manner as in Example 1; and a liquid crystal display device of Example 29 was produced in the same manner as in Example 1.

TABLE 9

|  | Example 27 | Example 28 | Example 29 |
|---|---|---|---|
| 3-Cy-Ph5-O4 | 9 | 10 | 11 |
| 3O-Ph5-Ph5-O2 | 8 | | |
| 5-Cy-Ph5-O4 | 9 | 10 | 11 |
| 0d1-Cy-Cy-5 | 5 | | |
| 0d1-O-Cy-Cy-Ph5-1 | | 10 | |
| 0d2-Cy-Cy-Ph5-O2 | 10 | | |
| 0d2-O-Cy-Cy-Ph5-1 | | 10 | |
| 1d2-O-Cy-Cy-Ph5-1 | | 8 | |
| 2-Cy-Cy-Ph5-1 | 11 | 12 | 12 |
| 2-Cy-Cy-Ph5-O2 | 9 | 10 | 9 |
| 3-Cy-Cb1-Ph5-O2 | | | 4 |
| 3-Cy-Cy-Ph5-1 | 10 | 11 | 12 |
| 3-Cy-Cy-Ph5-O2 | 10 | 10 | 9 |
| 3-O-Cy-Cy-Ph5-O2 | 10 | | |
| 5-Cy-Cb1-Ph5-O2 | | | 6 |
| 5-Cy-Cb-Ph5-O2 | | | 18 |
| 5-Cy-Cy-Ph5-O2 | 9 | 9 | 8 |
| Sum of composition ratios (%) | 100 | 100 | 100 |
| Tni/° C. | 101.2 | 103.9 | 118.1 |
| Δn (20°) | 0.100 | 0.098 | 0.105 |
| ne (20° C.) | 1.581 | 1.579 | 1.586 |
| Δε (20° C.) | −7.5 | −5.5 | −6.4 |
| ε⊥ (20° C.) | 11.9 | 9.5 | 10.4 |
| K3/K1 (20° C.) | 1.08 | 1.16 | 1.05 |
| K1/pN (20° C.) | 15.8 | 16.5 | 20.2 |
| Vsat/V (25° C.) | 2.31 | 2.83 | 2.68 |
| τr + d/msec (25° C., 6 V) | 7.1 | 6.3 | 7.0 |

The liquid crystal display devices of Examples 27 to 29 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

Examples 30 to 32

A liquid crystal display device of Example 30 was produced in the same manner as in Example 1 by interposing the liquid crystals having negative dielectric anisotropy indicated in Table 10; a liquid crystal display device of Example 31 was produced in the same manner as in Example 1; and a liquid crystal display device of Example 32 was produced in the same manner as in Example 1.

TABLE 10

|  | Example 30 | Example 31 | Example 32 |
|---|---|---|---|
| 3-Cy-Ph5-O4 | 16 | 16 | 16 |
| 5-Cy-Ph5-O2 | 12 | 16 | 16 |
| 0d1-Cy-Cy-5 | 7 | 4 | 10 |
| 0d3-Ph-Ph-1 | 11 | 10 | 10 |
| 1d1-Cy-Cy-3 | 9 | 8 | |
| 2-Cy-Ph-Ph5-O2 | 13 | 12 | 12 |
| 3-Cy-Cy-Ph5-O2 | 6 | 7 | 10 |
| 3-Cy-Ph-Ph5-O2 | 12 | 12 | 12 |
| 0d1-Cy-Cy-Ph-1 | 4 | 4 | 4 |
| 3-Cy-Ph-Ph-2 | 10 | 11 | 10 |
| Sum of composition ratios | 100 | 100 | 100 |
| Tni/° C. | 80.2 | 80.3 | 80.9 |
| Δn (20°) | 0.128 | 0.129 | 0.126 |
| ne (20° C.) | 1.492 | 1.491 | 1.491 |
| Δε (20° C.) | −3.3 | −3.5 | −3.7 |
| ε⊥ (20° C.) | 6.8 | 7.1 | 7.4 |
| K3/K1 (20° C.) | 0.99 | 1.01 | 1.04 |
| K1/pN (20° C.) | 16.7 | 15.2 | 16.4 |

TABLE 10-continued

|  | Example 30 | Example 31 | Example 32 |
|---|---|---|---|
| Vsat/V (25° C.) | 5.27 | 5.16 | 4.98 |
| τr + d/msec (25° C., 6 V) | 4.7 | 4.8 | 5.2 |

The liquid crystal display devices of Examples 30 to 32 realized higher response speeds, larger amounts of light transmission, a reduction in light leakage caused by external pressure, wider viewing angles, and higher contrast ratios, as compared with conventional VA liquid crystal display devices in which the same liquid crystals having negative dielectric anisotropy were interposed.

What is claimed is:

1. A liquid crystal display device comprising:
a first substrate;
a second substrate; and
a liquid crystal composition layer having negative dielectric anisotropy that is interposed between the first substrate and the second substrate,
the liquid crystal display device having a plurality of pixels, with each of the pixels being independently controllable, the pixel comprising a pair of a pixel electrode and a common electrode,
wherein the pixel electrode and the common electrode are provided on at least one substrate between the first substrate and second substrate, and the long axis of liquid crystal molecules in the liquid crystal composition layer being in a substantial vertical alignment or a hybrid alignment with respect to at least one substrate,
wherein the liquid crystal composition of the liquid crystal composition layer comprises two or more kinds of compounds selected from the group of compounds represented by General Formula (LC1) to General Formula (LC5):

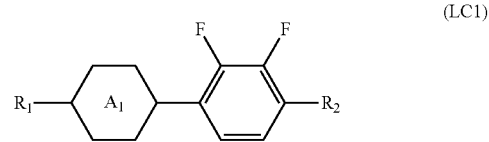

(LC1)

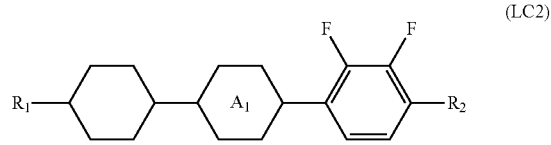

(LC2)

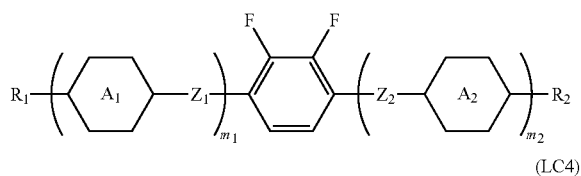

(LC3)

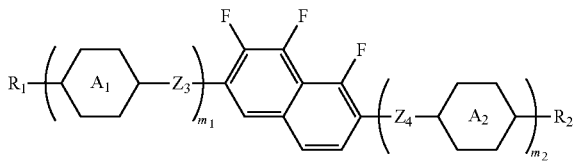

(LC4)

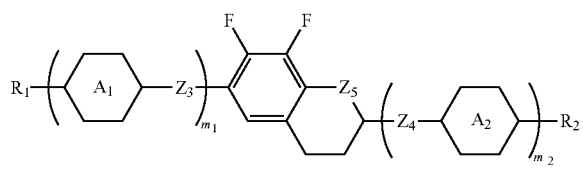

(LC5)

wherein $R_1$ and $R_2$ each independently represent an alkyl group having 1 to 15 carbon atoms; one or more $CH_2$ groups in the alkyl group are substituted by —O—, —CH=CH—, —CO—, —OCO—, —COO—, —$CF_2$O— or —O$CF_2$— such that O atoms are not directly adjacent to each other; one or more H atoms in the alkyl group may be optionally substituted by halogen; $A_1$ and $A_2$ each independently represent any one of the following structures:

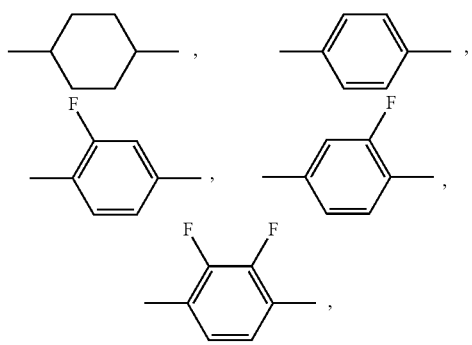

wherein one or more $CH_2$ groups of the cyclohexane ring in the structures may be substituted by O atoms; one or more CH groups of the benzene ring in the structures may be substituted by N atoms; and one or more H atoms may be substituted by Cl, $CF_3$ or $OCF_3$; $Z_1$ to $Z_4$ each independently represent a single bond, —CH=CH—, —$CH_2CH_2$—, —$(CH_2)_4$—, —COO—, —$OCH_2$—, —$CH_2O$—, —$OCF_2$— or —$CF_2O$—, while at least one of $Z_1$ and $Z_2$ is not a single bond; $Z_5$ represents a $CH_2$ group or an O atom; $m_1$ and $m_2$ each independently represent 0 to 3, and $m_1+m_2$ is 1, 2 or 3.

2. The liquid crystal display device according to claim 1, wherein the distance between the pixel electrode and the common electrode ($d_{gap}$, μm) is smaller than the width of the pixel electrode or the common electrode ($d_{ITO}$, μm).

3. The liquid crystal display device according to claim 1, wherein the liquid crystal composition of the liquid crystal composition layer further comprises one kind or more kinds of compounds represented by General Formula (LC6):

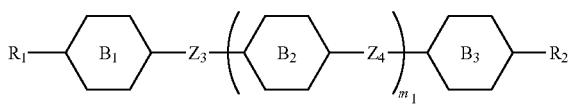

(LC6)

wherein $R_1$ and $R_2$ each independently represent an alkyl group having 1 to 15 carbon atoms; one or more $CH_2$ groups in the alkyl group may be substituted by —O—, —CH=CH—, —CO—, —COO—, —COO—, —$CF_2O$— or —$OCF_2$— such that O atoms are not directly adjacent to each other; one or more H atoms in the alkyl group may be optionally substituted by halogen; $B_1$ to $B_3$ each independently represent any one of the following:

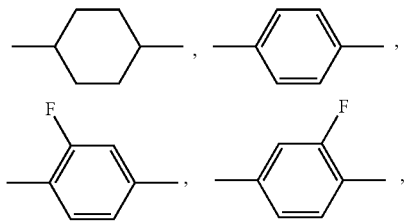

wherein one or more $CH_2CH_2$ groups in the cyclohexane ring are substituted by —CH=CH—, —$CF_2O$—, or —$OCF_2$—; and one or more CH groups in the benzene ring may be substituted by N atoms; $Z_3$ and $Z_4$ each independently represent a single bond, —CH=CH—, —$CH_2CH_2$—, —$(CH_2)_4$—, —COO—, —$OCH_2$—, —$CH_2O$—, —$OCF_2$— or —$CF_2O$—; at least one of $Z_1$ and $Z_2$ is not a single bond; and $m_1$ represents 0 to 3.

4. The liquid crystal display device according to claim 1, wherein the compound of General Formula (LC2) is one kind or more kinds of compounds selected from the group consisting of compounds represented by the following General Formula (LC2)-1 to General Formula (LC2)-3:

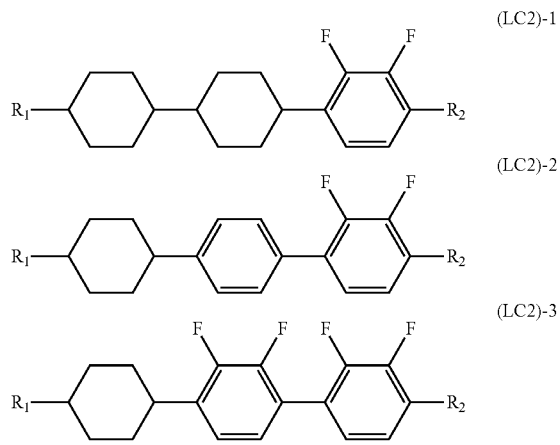

5. The liquid crystal display device according to claim 1, wherein the compound of General Formula (LC3) is one kind or more kinds of compounds selected from the group consisting of compounds represented by the following General Formula (LC3)-1 to General Formula (LC3)-13:

[Chemical Formula 6]

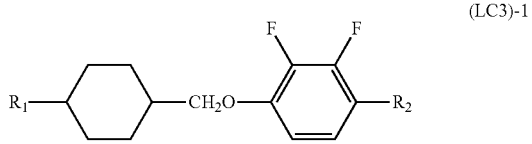

(LC3)-1

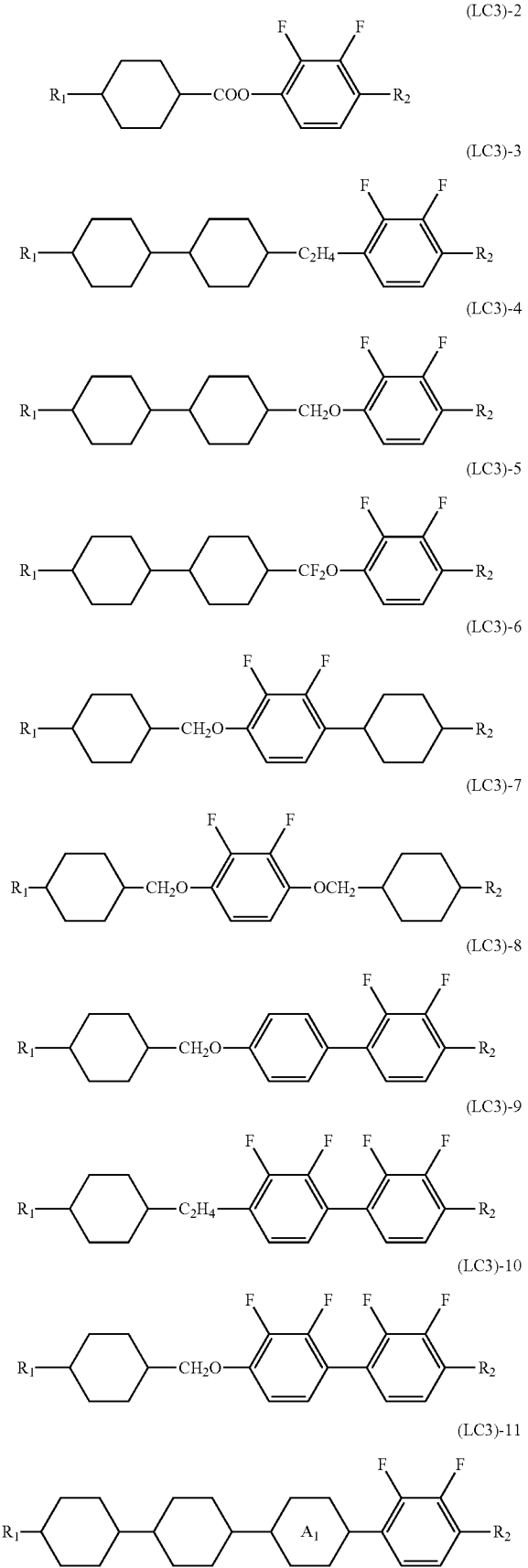
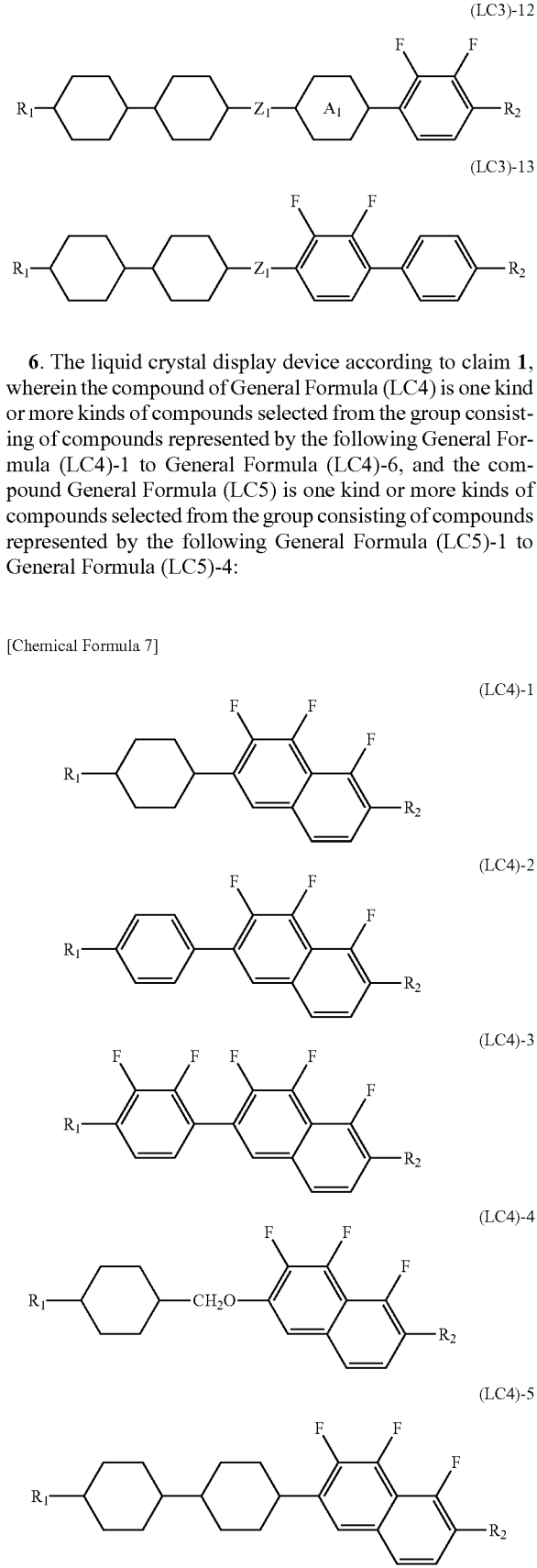

6. The liquid crystal display device according to claim 1, wherein the compound of General Formula (LC4) is one kind or more kinds of compounds selected from the group consisting of compounds represented by the following General Formula (LC4)-1 to General Formula (LC4)-6, and the compound General Formula (LC5) is one kind or more kinds of compounds selected from the group consisting of compounds represented by the following General Formula (LC5)-1 to General Formula (LC5)-4:

[Chemical Formula 7]

-continued

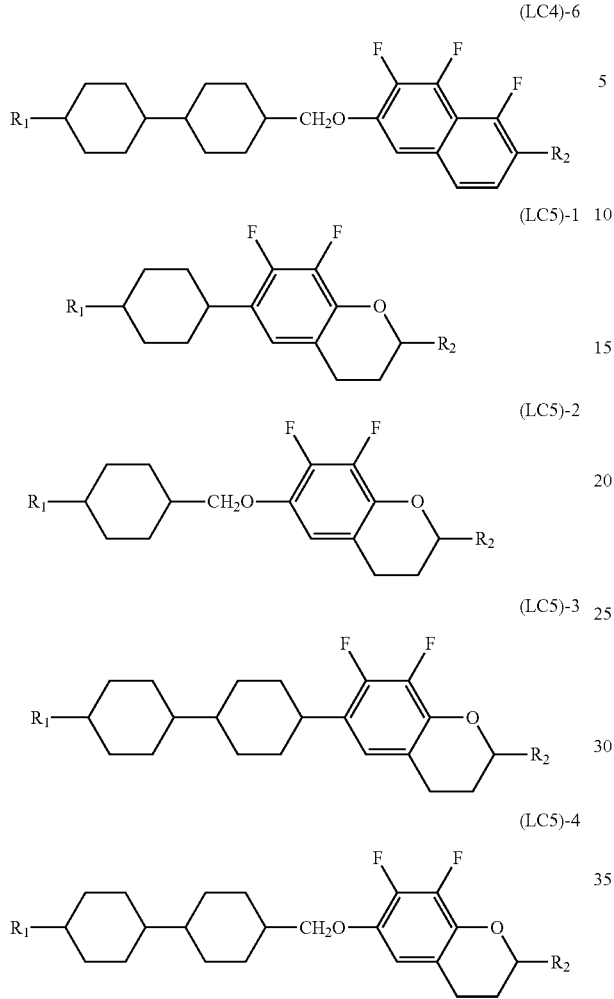

7. The liquid crystal display device according to claim 3, wherein the compound of General Formula (LC6) is one kind or more kinds of compounds selected from the group consisting of compounds represented by General Formula (LC6)-1 to General Formula (LC6)-11:

[Chemical Formula 8]

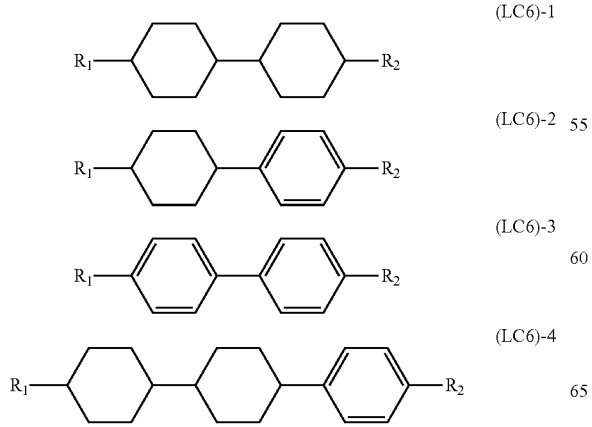

-continued

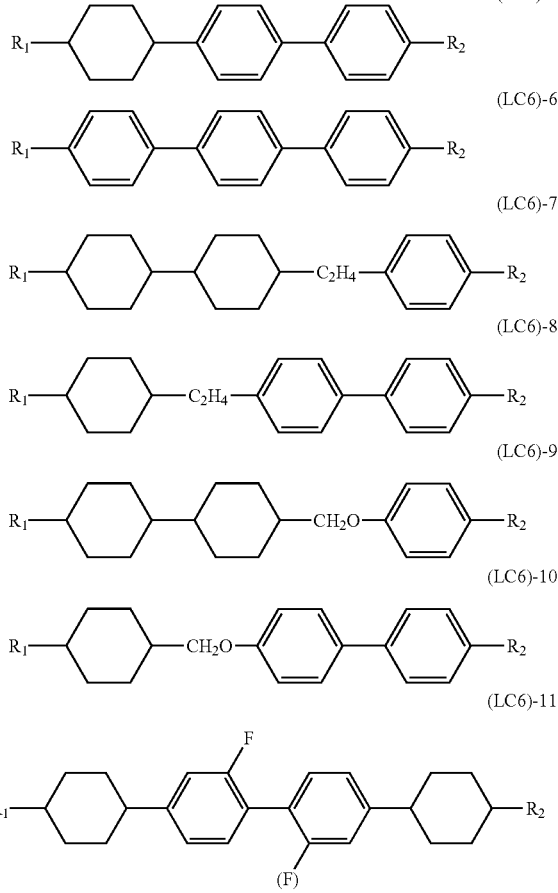

8. The liquid crystal display device according to claim 3 or 7, wherein the liquid crystal composition comprises 30% to 70% by mass of the compound represented by General Formula (LC6), and the viscosity η of the liquid crystal composition at 20° C. is 20 mPa·s or less.

9. The liquid crystal display device according to claim 1, wherein a liquid crystal composition comprising two or more kinds of compounds represented by General Formulas (LC1) to (LC5), in which Ac is −4 or less, is used.

10. The liquid crystal display device according to claim 1, wherein a liquid crystal composition comprising two or more kinds of compounds represented by General Formulas (LC1) to (LC5), in which Ac is −4 or less, in an amount of 70% to 30% by mass, and further comprising a compound represented by General Formula (LC6):

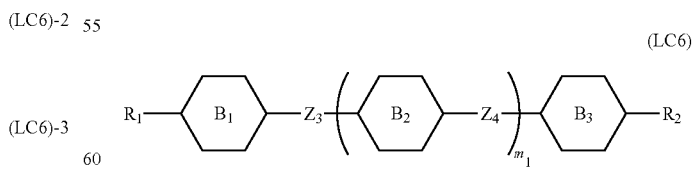

wherein $R_1$ and $R_2$ each independently represent an alkyl group having 1 to 15 carbon atoms; one or more $CH_2$ groups in the alkyl group may be substituted by —O—, —CH=CH—, —CO—, —COO—, —COO—, —$CF_2$O— or —O$CF_2$— such that O atoms are not directly adjacent to each other; one or more H atoms in the alkyl group may be optionally substituted by halogen; $B_1$ to $B_3$ each independently represent any one of the following:

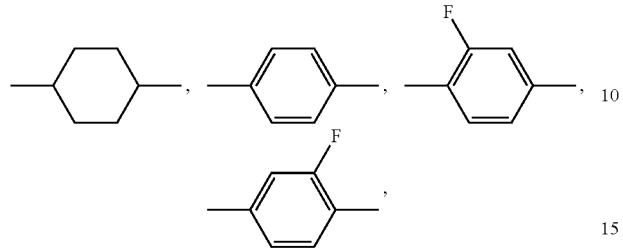

wherein one or more $CH_2CH_2$ groups in the cyclohexane ring are substituted by —CH=CH—, —$CF_2O$—, or —$OCF_2$—, and one or more CH groups in the benzene ring mat be substituted by N atoms; $Z_3$ and $Z_4$ each independently represent a single bond —CH=CH—, —C≡C—, —$CH_2CH_2$—, —$(CH_2)_4$—, —COO—, —$OCH_2$—, —$CH_2O$—, —$OCF_2$— or —$CF_2O$—; at least one of $Z_1$ and $Z_2$ is not a single bond; and $m_1$ represents 0 to 3, in an amount of 30% to 70% by mass, is used.

11. The liquid crystal display device according to claim 3, wherein the liquid crystal composition comprises two or more kinds of compounds represented by General Formula (LC2) to (LC5), in which Ac is −4 or less, in an amount of 70% to 30% by mass, and comprises a compound represented by General Formula (LC6) in an amount of 30% to 70% by mass.

12. The liquid crystal display device according to claim 1, wherein a liquid crystal composition further comprising one kind or more kinds of polymerizable compounds is used as the liquid crystal composition layer.

13. The liquid crystal display device according to claim 12, wherein the polymerizable compound is a disc-shaped liquid crystal compound having a structure in which a benzene derivative, a triphenylene derivative, a truxene derivative, a phthalocyanine derivative or a cyclohexane derivative serves as a parent nucleus at the center of the molecule, and a linear alkyl group, a linear alkoxy group or a substituted benzoyloxy group is radially substituted as a side chain.

14. The liquid crystal display device according to claim 12, wherein the polymerizable compound is a polymerizable compound represented by General Formula (PC1):

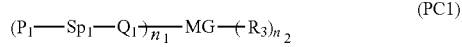 (PC1)

wherein $P_1$ represents a polymerizable functional group; $Sp_1$ represents a spacer group having 0 to 20 carbon atoms; $Q_1$ represents a single bond, —O—, —NH—, —NHCOO—, —OCONH—, —CH=CH—, —CO—, —COO—, —COO—, —OCOO—, —OOCO—, —CH=CH—, —CH=CH—COO—, —OCO—CH=CH— or —C≡C—; $n_1$ and $n_2$ each represent 1, 2 or 3; MG represents a mesogen group or a mesogenic supporting group; $R_3$ represents a halogen atom, a cyano group or an alkyl group having 1 to 25 carbon atoms; one or more $CH_2$ groups in the alkyl group may be substituted by —O—, —S—, —NH—, —N(CH$_3$)—, —CO—, —COO—, —OCO—, —OCOO—, —SCO—, —COS— or —C≡C— such that O atoms are not directly adjacent to each other; or $R_3$ represents $P_2$—$Sp_2$-$Q_2$-; wherein $P_2$, $Sp_2$ and $Q_2$ have the same meanings as $P_1$, $Sp_1$ and $Q_1$, respectively.

15. The liquid crystal display device according to claim 14, wherein in General Formula (PC1), MG is represented by the following structure:

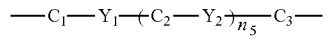

wherein $C_1$ to $C_3$ each independently represent a 1,4-phenylene group, a 1,4-cyclohexylene group, a 1,4-cyclohexenyl group, a tetrahydropyrane-2,5-diyl group, a 1,3-dioxane-2,5-diyl group, a tetrahydrothiopyrane-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, 1,2,3,4-tetrahydronaphthalene-2,6-diyl group, 2,6-naphthylene group, phenanthrene-2,7-diyl group, 9, 10-dihydrophenanthrene-2,7-diyl group, 1,2,3,4,4a,9, 10a-octahydrophenanthrene-2,7-diyl group, and fluorene-2,7-diyl group may have, as substituents, one or more of F, Cl, $CF_3$, $OCF_3$, a cyano group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group or an alkenoyloxy group; $Y_1$ and $Y_2$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2COO$—, —$CH_2CH_2OCO$—, —$COOCH_2CH_2$—, —$OCOCH_2CH_2$—, —CONH—, —NHCO—, or a single bond; and $n_5$ represents 0, 1 or 2.

16. The liquid crystal display device according to claim 14, wherein in General Formula (PC1), $Sp_1$ and $Sp_2$ each independently represent an alkylene group, the alkylene group may be substituted with one or more halogen atoms or CN, and one or more $CH_2$ groups present in the group may be substituted by —O—, —S—, —NH—, —N(CH$_3$)—, —CO—, —COO—, —OCO—, —OCOO—, —SCO—, —COS— or —C≡C— such that O atoms are not directly adjacent to each other.

17. The liquid crystal display device according to claim 14, wherein in General Formula (PC1), $P_1$ and $P_2$ each independently represent a structure selected from the group consisting of compounds represented by the following General Formula (PC1-a) to General Formula (PC1-d):

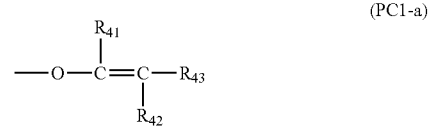 (PC1-a)

 (PC1-b)

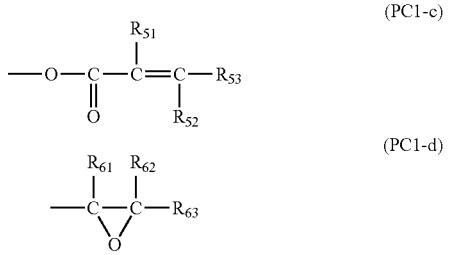

wherein $R_{41}$ to $R_{43}$, $R_{51}$ to $R_{53}$, and $R_{61}$ to $R_{63}$ each independently represent a hydrogen atom, a halogen atom, or an alkyl group having 1 to 5 carbon atoms.

18. The liquid crystal display device according to claim 15, wherein the compound of General Formula (PC1) is a polymerizable compound represented by General Formula (PC1)-1 or General Formula (PC1)-2:

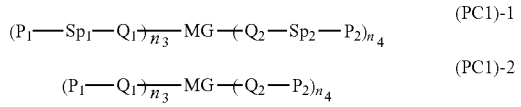

wherein $P_1$, $Sp_1$, $Q_1$, $P_2$, $SP_2$, $Q_2$ and MG have the same meanings as $P_1$, $Sp_1$, $Q_1$, $P_2$, $SP_2$, $Q_2$ and MG of General Formula (PC1), respectively; and $n_3$ and $n_4$ each independently represent 1, 2 or 3.

19. The liquid crystal display device according to claim 14, wherein the compound of General Formula (PC1) is one kind or more kinds of compounds selected from the group consisting of compounds represented by General Formula (PC1)-3 to General Formula (PC1)-8:

wherein $W_1$ each independently represents F, $CF_3$, $OCF_3$, $CH_3$, $OCH_3$, an alkyl group having 2 to 5 carbon atoms, an alkoxy group, an alkenyl group, $COOW_2$, $OCOW_2$ or $OCOOW_2$, wherein $W_2$ represents a linear or branched alkyl group having 1 to 10 carbon atoms, or an alkenyl group having 2 to 5 carbon atoms; and $n_6$ represents 0, 1, 2, 3 or 4.

20. The liquid crystal display device according to claim 14, wherein in General Formula (PC1) $Sp_1$, $Sp_2$, $Q_1$ and $Q_2$ are all single bonds.

21. The liquid crystal display device according to claim 19, wherein in General Formula (PC1)-3 to General Formula (PC1)-8, $n_3+n_4$ is from 3 to 6.

22. The liquid crystal display device according to claim 17, wherein in General Formula (PC1) $P_1$ and $P_2$ represent General Formula (PC1-b).

23. The liquid crystal display device according to claim 19, wherein in General Formula (PC1)-3 to General Formula (PC1)-8, $W_1$ represents F, $CF_3$, $OCF_3$, $CH_3$ or $OCH_3$, and $n_6$ represents 1, 2, 3 or 4.

24. The liquid crystal display device according to claim 14, wherein a liquid crystal composition further comprising one kind or more kinds of disc-shaped liquid crystal compounds represented by General (PC1) in which MG is represented by General Formula (PC1)-9:

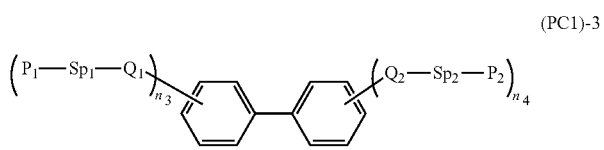
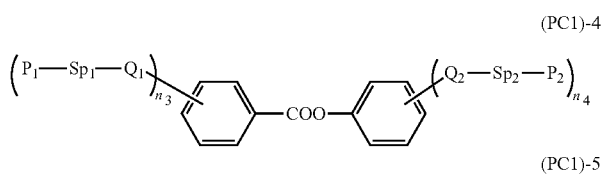
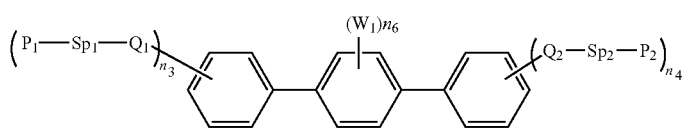
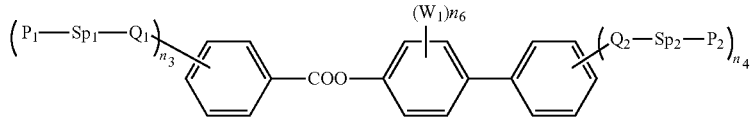
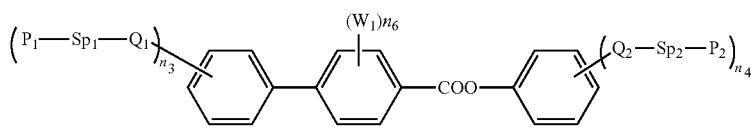
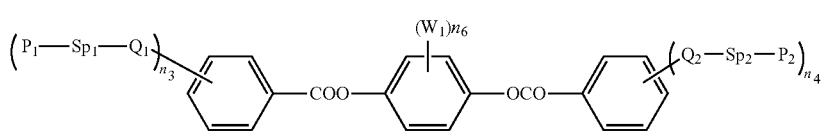

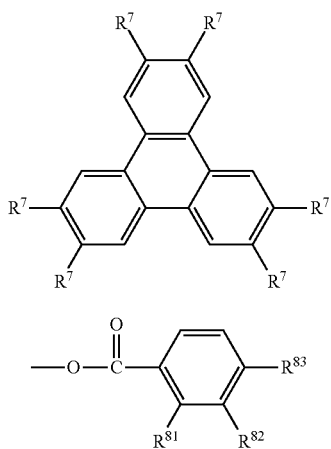

(PC1)-9

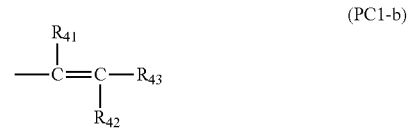

(PC1-e)

wherein $R_7$ each independently represents $P_1$—$Sp_1$-$Q_1$ or a substituent of General Formula (PC1-e), wherein $P_1$, $Sp_1$ and $Q_1$ have the same meanings as $P_1$, $Sp_1$ and $Q_1$ of General Formula (PC1); $R_{81}$ and $R_{82}$ each independently represent a hydrogen atom, a halogen atom or a methyl group; $R_{83}$ represents an alkoxy group having 1 to 20 carbon atoms; and at least one hydrogen atom in the alkoxy group is substituted by a substituent represented by any one of General Formulas (PC1-a) to (PC1-d):

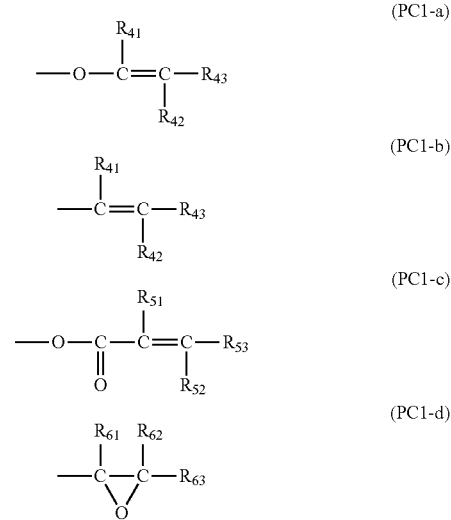

(PC1-a)

(PC1-b)

(PC1-c)

(PC1-d)

wherein $R_{41}$ to $R_{43}$, $R_{51}$ to $R_{53}$, and $R_{61}$ to $R_{63}$ each independently represent a hydrogen atom, a halogen atom, or an alkyl group having 1 to 5 carbon atoms.

25. The liquid crystal display device according to claim 12, wherein the liquid crystal composition does not comprise a polymerization initiator.

26. The liquid crystal display device according to claim 12, wherein the content of the polymerizable compound is 0.05% to 2.0% by mass.

27. The liquid crystal display device according to claim 1, wherein the product (Δn·d) of the refractive index anisotropy (Δn) of the liquid crystal composition and the distance (d) between the first substrate and the second substrate of the display device is 0.30 to 0.40.

28. The liquid crystal display device according to claim 1, further comprising an alignment film, wherein the alignment film formed from a polyimide (PI), a polyamide, a chalcone, a cinnamate or a cinnamoyl is provided on each of the surfaces that are in contact with the liquid crystal composition on the first substrate and the second substrate of the liquid crystal display device.

29. The liquid crystal display device according to claim 28, wherein the alignment film produced by utilizing a photo-alignment technology is provided on each of the surfaces that are in contact with the liquid crystal composition on the first substrate and the second substrate of the liquid crystal display device.

30. The liquid crystal display device according to claim 1, wherein the tilt angle of the liquid crystal composition on the substrate surface is 85° to 90°.

31. The liquid crystal display device according to claim 1, wherein the tilt angle of the liquid crystal composition on any one substrate surface of the first substrate and the second substrate is 85° to 90°, and the tilt angle of the liquid crystal composition on the other substrate surface of the first substrate and the second substrate is 3° to 20°.

32. The liquid crystal display device according to claim 19, wherein in General Formula (PC1)-3 to General Formula (PC1)-8, $Sp_1$, $Sp_2$, $Q_1$ and $Q_2$ are all single bonds.

33. The liquid crystal display device according to claim 19, wherein in General Formula (PC1)-3 to General Formula (PC1)-8, $P_1$ and $P_2$ represent General Formula (PC1-b):

(PC1-b)

$$—\underset{\underset{R_{42}}{|}}{\overset{\overset{R_{41}}{|}}{C}}=C—R_{43}$$

wherein $R_{41}$ to $R_{43}$ each independently represent a hydrogen atom, a halogen atom, or an alkyl group having 1 to 5 carbon atoms.

* * * * *